US012122691B1

(12) United States Patent
Borras et al.

(10) Patent No.: US 12,122,691 B1
(45) Date of Patent: Oct. 22, 2024

(54) REMOVAL OF FLUOROALKYL COMPOUNDS FROM WATER USING GALVANIC CELL

(71) Applicant: NuQuatic, LLC, St. Paul, MN (US)

(72) Inventors: Carlos Borras, Ruskin, FL (US); Donald A. Luke, Valrico, FL (US)

(73) Assignee: NuQuatic, LLC, St. Paul, MN (US)

( * ) Notice: Subject to any disclaimer, the term of this patent is extended or adjusted under 35 U.S.C. 154(b) by 0 days.

(21) Appl. No.: 18/628,020

(22) Filed: Apr. 5, 2024

Related U.S. Application Data

(60) Provisional application No. 63/457,215, filed on Apr. 5, 2023, provisional application No. 63/470,046, filed on May 31, 2023, provisional application No. 63/544,328, filed on Oct. 16, 2023.

(51) Int. Cl.
| | | |
|---|---|---|
| C02F 1/46 | (2023.01) | |
| C02F 1/32 | (2023.01) | |
| C02F 1/461 | (2023.01) | |
| C02F 1/66 | (2023.01) | |
| C02F 1/68 | (2023.01) | |
| C02F 101/36 | (2006.01) | |

(52) U.S. Cl.
CPC ............ *C02F 1/46176* (2013.01); *C02F 1/32* (2013.01); *C02F 1/46109* (2013.01); *C02F 1/66* (2013.01); *C02F 1/683* (2013.01); *C02F 2001/46133* (2013.01); *C02F 2101/36* (2013.01); *C02F 2209/06* (2013.01)

(58) Field of Classification Search
CPC ...... C02F 1/32; C02F 1/66; C02F 1/68; C02F 1/46
See application file for complete search history.

(56) References Cited

U.S. PATENT DOCUMENTS

| 1,018,355 A | 2/1912 | Galbreath |
| 2,449,706 A | 9/1948 | Jones |
| 3,425,925 A | 2/1969 | Fleischman |
| (Continued) | | |

FOREIGN PATENT DOCUMENTS

| AU | 2020291450 B2 | 2/2023 |
| CA | 2953591 A1 | 7/2018 |
| (Continued) | | |

OTHER PUBLICATIONS

"U.S. Appl. No. 17/249,343, Corrected Notice of Allowability mailed Dec. 22, 2021", 3 pgs.
(Continued)

*Primary Examiner* — Walter D. Griffin
*Assistant Examiner* — Cameron J Allen
(74) *Attorney, Agent, or Firm* — Schwegman Lundberg & Woessner, P.A.

(57) ABSTRACT

A method of treating contaminated water includes contacting the contaminated water including a fluoroalkyl compound with a galvanic cell to form galvanic cell-treated water including a galvanic cell-treated fluoroalkyl compound. The method also includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

20 Claims, 10 Drawing Sheets

(56) References Cited

U.S. PATENT DOCUMENTS

| | | |
|---|---|---|
| 3,660,162 A | 5/1972 | Eisenberg |
| 3,766,045 A | 10/1973 | Itakura et al. |
| 3,901,804 A | 8/1975 | Ohuchi et al. |
| 4,011,151 A | 3/1977 | Ito et al. |
| 4,179,347 A | 12/1979 | Krause et al. |
| 4,388,195 A | 6/1983 | Von et al. |
| 4,655,895 A | 4/1987 | Feofanov et al. |
| 5,167,777 A | 12/1992 | Kaczur et al. |
| 5,439,566 A | 8/1995 | Zucker |
| 5,454,917 A | 10/1995 | Mattison et al. |
| 5,876,575 A | 3/1999 | Kump |
| 5,976,383 A | 11/1999 | Guess et al. |
| 6,149,797 A | 11/2000 | Carey et al. |
| 6,180,014 B1 | 1/2001 | Salama |
| 6,210,587 B1 | 4/2001 | Vion |
| 6,893,567 B1 | 5/2005 | Vanotti et al. |
| 7,118,665 B2 | 10/2006 | Kin et al. |
| 7,582,198 B2 | 9/2009 | Wilkins et al. |
| 7,704,353 B2 | 4/2010 | Stadelmann et al. |
| 7,815,779 B2 | 10/2010 | Flettner |
| 7,858,598 B2 | 12/2010 | Yang et al. |
| 8,147,695 B2 | 4/2012 | Banerjee et al. |
| 8,673,129 B2 | 3/2014 | Gordon et al. |
| 8,715,469 B2 | 5/2014 | Pancurák et al. |
| 8,926,804 B2 | 1/2015 | Pancurák et al. |
| 9,067,801 B2 | 6/2015 | Nagghappan |
| 9,346,692 B2 | 5/2016 | Combs et al. |
| 9,446,974 B2 | 9/2016 | Milner et al. |
| 9,580,338 B2 | 2/2017 | Fujikane et al. |
| 9,593,030 B2 | 3/2017 | Fujikane et al. |
| 9,637,403 B2 | 5/2017 | Mckay et al. |
| 9,865,860 B2 | 1/2018 | Fauland |
| 10,003,095 B2 | 6/2018 | Kovacs et al. |
| 10,230,119 B2 | 3/2019 | Kovacs et al. |
| 10,266,428 B1 | 4/2019 | Brian |
| 10,343,937 B2 | 7/2019 | Casbeer et al. |
| 10,427,195 B2 | 10/2019 | Ball |
| 10,513,786 B2 | 12/2019 | Beddoes et al. |
| 10,519,052 B2 | 12/2019 | Ball et al. |
| 10,538,436 B2 | 1/2020 | Hu et al. |
| 10,611,651 B2 | 4/2020 | Martikainen et al. |
| 10,665,846 B2 | 5/2020 | Fauland |
| 10,676,378 B2 | 6/2020 | Tandukar et al. |
| 10,700,392 B2 | 6/2020 | Pantel et al. |
| 10,752,521 B2 | 8/2020 | Nelson |
| 10,800,678 B2 | 10/2020 | Gifford et al. |
| 10,808,327 B2 | 10/2020 | Griffis et al. |
| 10,865,128 B2 | 12/2020 | Ball |
| 10,882,766 B2 | 1/2021 | Taylor |
| 10,954,144 B2 | 3/2021 | Ball et al. |
| 11,136,248 B2 | 10/2021 | Pettersson et al. |
| 11,148,964 B2 | 10/2021 | Ball |
| 11,220,443 B2 | 1/2022 | Borras et al. |
| 11,225,420 B2 | 1/2022 | Borras et al. |
| 11,312,646 B2 | 4/2022 | Gunasekaran et al. |
| 11,345,620 B2 | 5/2022 | Zhu et al. |
| 11,384,441 B2 | 7/2022 | Beddoes et al. |
| 11,401,180 B2 | 8/2022 | Dejarme et al. |
| 11,401,181 B1 | 8/2022 | Borras et al. |
| 11,407,666 B2 | 8/2022 | Rosansky et al. |
| 11,433,152 B2 | 9/2022 | Saue |
| 11,512,011 B2 | 11/2022 | Huang et al. |
| 11,512,012 B2 | 11/2022 | Chiang et al. |
| 11,541,438 B2 | 1/2023 | Morrell |
| 11,548,800 B2 | 1/2023 | Franceschi-hofmann et al. |
| 11,584,665 B2 | 2/2023 | Green et al. |
| 11,623,884 B1 | 4/2023 | Menon et al. |
| 11,643,339 B2 | 5/2023 | Nelson |
| 11,679,999 B2 | 6/2023 | Newell et al. |
| 11,713,261 B2 | 8/2023 | Griffis et al. |
| 11,780,746 B2 | 10/2023 | Duckworth et al. |
| 11,780,753 B2 | 10/2023 | Dejarme et al. |
| 11,896,948 B2 | 2/2024 | Chang et al. |
| 2001/0000485 A1 | 4/2001 | Ying et al. |
| 2003/0168411 A1 | 9/2003 | Hiro et al. |
| 2003/0226803 A1 | 12/2003 | Kamiya et al. |
| 2004/0151957 A1 | 8/2004 | Brooks et al. |
| 2004/0251212 A1 | 12/2004 | Ikematsu et al. |
| 2005/0011765 A1 | 1/2005 | Omasa |
| 2005/0173262 A1 | 8/2005 | Nakanishi et al. |
| 2006/0000784 A1 | 1/2006 | Khudenko |
| 2006/0096853 A1 | 5/2006 | King |
| 2006/0254929 A1 | 11/2006 | Mikio |
| 2009/0120863 A1 | 5/2009 | Salama et al. |
| 2009/0282627 A1 | 11/2009 | Porat |
| 2010/0000924 A1 | 1/2010 | Hayashi et al. |
| 2010/0051477 A1 | 3/2010 | Jeon et al. |
| 2010/0126879 A1 | 5/2010 | Wilman et al. |
| 2011/0223523 A1 | 9/2011 | Lopez et al. |
| 2012/0037498 A1 | 2/2012 | Pancurak et al. |
| 2013/0162097 A1 | 6/2013 | Shinmoto et al. |
| 2013/0180857 A1 | 7/2013 | Heffernan et al. |
| 2013/0220919 A1 | 8/2013 | Bilbao et al. |
| 2013/0277231 A1 | 10/2013 | Greenberg |
| 2014/0327239 A1 | 11/2014 | Stanley |
| 2015/0001094 A1 | 1/2015 | Ibeid et al. |
| 2015/0151985 A1 | 6/2015 | Johnson et al. |
| 2018/0141836 A1 | 5/2018 | Hu et al. |
| 2019/0002321 A1 | 1/2019 | Grönfors et al. |
| 2019/0092653 A1 | 3/2019 | Arbeus et al. |
| 2020/0010341 A1 | 1/2020 | Harvey et al. |
| 2020/0029714 A1 | 1/2020 | Nguyen et al. |
| 2020/0165149 A1 | 5/2020 | Zhu et al. |
| 2020/0270149 A1 | 8/2020 | Bejan et al. |
| 2020/0325041 A1 | 10/2020 | Cosentino et al. |
| 2020/0369547 A1 | 11/2020 | Davy et al. |
| 2021/0147265 A1 | 5/2021 | Andrews et al. |
| 2021/0179456 A1 | 6/2021 | Borras et al. |
| 2021/0188666 A1 | 6/2021 | Borras et al. |
| 2021/0221717 A1 | 7/2021 | Buschmann |
| 2022/0073380 A1 | 3/2022 | Schneider et al. |
| 2022/0073383 A1 | 3/2022 | Borras et al. |
| 2022/0081330 A1 | 3/2022 | Borras et al. |
| 2022/0106208 A1 | 4/2022 | Borras et al. |
| 2022/0315457 A1 | 10/2022 | Borras et al. |
| 2024/0010528 A1 | 1/2024 | Borras et al. |

FOREIGN PATENT DOCUMENTS

| | | |
|---|---|---|
| CN | 2099752 U | 3/1992 |
| CN | 104291415 A | 1/2015 |
| CN | 205692940 U | 11/2016 |
| CN | 107235537 A | 10/2017 |
| CN | 207330680 U | 5/2018 |
| CN | 209636053 U | 11/2019 |
| CN | 114502512 A | 5/2022 |
| CN | 114555214 A | 5/2022 |
| CN | 117203166 A | 12/2023 |
| JP | H10473 A | 1/1998 |
| JP | H11277066 A | 10/1999 |
| JP | 2001276849 A | 10/2001 |
| JP | 2003225672 A | 8/2003 |
| JP | 2004016868 A | 1/2004 |
| JP | 2004066223 A | 3/2004 |
| JP | 2005325437 A | 11/2005 |
| JP | 2012011375 A | 1/2012 |
| JP | 2022537699 A | 8/2022 |
| JP | 2022538780 A | 9/2022 |
| JP | 7237209 B2 | 3/2023 |
| JP | 2024509544 | 3/2024 |
| JP | 7463409 | 4/2024 |
| PL | 224187 B1 | 11/2016 |
| RU | 2029735 C1 | 2/1995 |
| RU | 2142918 C1 | 12/1999 |
| WO | WO-2000000670 A1 | 1/2000 |
| WO | WO-2004046042 A2 | 6/2004 |
| WO | WO-2008064460 A1 | 6/2008 |
| WO | WO-2011107984 A2 | 9/2011 |
| WO | WO-2012048425 A1 | 4/2012 |
| WO | WO-2013016821 A1 | 2/2013 |
| WO | WO-2013017901 A1 | 2/2013 |
| WO | WO-2013075240 A1 | 5/2013 |
| WO | WO-2014165998 A1 | 10/2014 |
| WO | WO-2016024408 A1 | 2/2016 |

(56) References Cited

FOREIGN PATENT DOCUMENTS

| WO | WO-2016054749 | A1 | | 4/2016 | |
|---|---|---|---|---|---|
| WO | WO-2020247029 | A1 | * | 12/2020 | ......... B01D 61/0271 |
| WO | WO-2020252241 | A1 | | 12/2020 | |
| WO | WO-2020252242 | A1 | | 12/2020 | |
| WO | WO-2022186877 | A2 | | 9/2022 | |
| WO | WO-2022186877 | A3 | | 10/2022 | |
| WO | WO-2023114025 | A1 | | 6/2023 | |
| WO | WO-2023205352 | A1 | | 10/2023 | |
| WO | WO-2023215271 | A1 | * | 11/2023 | |
| WO | WO-2023244720 | A1 | | 12/2023 | |

OTHER PUBLICATIONS

"U.S. Appl. No. 17/249,343, Final Office Action mailed Oct. 1, 2021", 16 pgs.
"U.S. Appl. No. 17/249,343, Non Final Office Action mailed Jun. 15, 2021", 17 pgs.
"U.S. Appl. No. 17/249,343, Notice of Allowance mailed Nov. 23, 2021", 10 pgs.
"U.S. Appl. No. 17/249,343, Response filed Jun. 7, 2021 to Restriction Requirement mailed Apr. 30, 2021", 10 pgs.
"U.S. Appl. No. 17/249,343, Response filed Sep. 7, 2021 to Non Final Office Action mailed Jun. 15, 2021", 21 pgs.
"U.S. Appl. No. 17/249,343, Response filed Nov. 4, 2021 to Final Office Action mailed Oct. 1, 2021", 15 pgs.
"U.S. Appl. No. 17/249,343, Restriction Requirement mailed Apr. 30, 2021", 7 pgs.
"U.S. Appl. No. 17/249,345, Corrected Notice of Allowability mailed Dec. 10, 2021", 4 pgs.
"U.S. Appl. No. 17/249,345, Non Final Office Action mailed Jun. 24, 2021", 26 pgs.
"U.S. Appl. No. 17/249,345, Notice of Allowance mailed Sep. 27, 2021", 12 pgs.
"U.S. Appl. No. 17/249,345, Response filed Jun. 7, 2021 to Restriction Requirement mailed May 3, 2021", 11 pgs.
"U.S. Appl. No. 17/249,345, Response filed Sep. 7, 2021 to Non Final Office Action mailed Jun. 24, 2021", 19 pgs.
"U.S. Appl. No. 17/249,345, Restriction Requirement mailed May 3, 2021", 8 pgs.
"U.S. Appl. No. 17/340,254, Advisory Action mailed Jan. 24, 2022", 3 pgs.
"U.S. Appl. No. 17/340,254, Final Office Action mailed Nov. 19, 2021", 10 pgs.
"U.S. Appl. No. 17/340,254, Non Final Office Action mailed Sep. 23, 2021", 10 pgs.
"U.S. Appl. No. 17/340,254, Notice of Allowability mailed Apr. 25, 2022", 3 pgs.
"U.S. Appl. No. 17/340,254, Notice of Allowance mailed Mar. 31, 2022", 7 pgs.
"U.S. Appl. No. 17/340,254, Response filed Jan. 5, 2022 to Final Office Action mailed Nov. 19, 2021", 14 pgs.
"U.S. Appl. No. 17/340,254, Response filed Feb. 21, 2022 to Advisory Action mailed Jan. 24. 2022", 18 pgs.
"U.S. Appl. No. 17/340,254, Response filed Nov. 4, 2021 to Non Final Office Action mailed Sep. 23, 2021", 15 pgs.
"U.S. Appl. No. 17/530,907, Non Final Office Action mailed Jan. 10, 2024", 32 pgs.
"U.S. Appl. No. 17/530,907, Response filed Mar. 22, 2024 to Non Final Office Action mailed Jan. 10, 2024", 18 pgs.
"U.S. Appl. No. 17/533,522, Advisory Action mailed Mar. 8, 2024", 4 pgs.
"U.S. Appl. No. 17/533,522, Final Office Action mailed Dec. 26, 2023", 30 pgs.
"U.S. Appl. No. 17/533,522, Non Final Office Action mailed Jan. 26, 2023", 16 pgs.
"U.S. Appl. No. 17/533,522, Non Final Office Action mailed Jun. 28, 2023", 28 pgs.
"U.S. Appl. No. 17/533,522, Response filed Feb. 23, 2024 to Final Office Action mailed Dec. 26, 2023", 18 pgs.
"U.S. Appl. No. 17/533,522, Response filed Mar. 23, 2023 to Non Final Office Action mailed Jan. 26, 2023", 13 pgs.
"U.S. Appl. No. 17/533,522, Response filed Sep. 22, 2023 to Non Final Office Action mailed Jun. 28, 2023", 16 pgs.
"U.S. Appl. No. 17/838,361, Final Office Action mailed Oct. 31, 2023", 11 pgs.
"U.S. Appl. No. 17/838,361, Non Final Office Action mailed Aug. 7, 2023", 8 pgs.
"U.S. Appl. No. 17/838,361, Response filed Jan. 24, 2024 to Final Office Action mailed Oct. 31, 2023", 16 pgs.
"U.S. Appl. No. 17/838,361, Response filed Sep. 22, 2023 to Non Final Office Action mailed Aug. 7, 023", 13 pgs.
"Australian Application Serial No. 2020291450, First Examination Report mailed Oct. 28, 2022", 3 pgs.
"Australian Application Serial No. 2020291450, Response filed Dec. 19, 2022 to First Examination Report mailed Oct. 28, 2022", 18 pgs.
"Australian Application Serial No. 2020291534, First Examination Report mailed Nov. 9, 2022", 4 pgs.
"Australian Application Serial No. 2020291534, Response filed Mar. 23, 2023 to First Examination Report mailed Nov. 9, 2022", 10 pgs.
"Australian Application Serial No. 2021430769, First Examination Report mailed Mar. 22, 2024", 3 pgs.
"Canadian Application Serial No. 3,140,014, Examiners Rule 86(2) Report mailed Feb. 9, 2024", 4 pgs.
"Canadian Application Serial No. 3,140,014, Examiners Rule 86(2) Report mailed Jul. 17, 2023", 3 pgs.
"Canadian Application Serial No. 3,140,014, Examiners Rule 86-2 Report mailed Sep. 20, 2022", 5 pgs.
"Canadian Application Serial No. 3,140,014, Response filed Jan. 9, 2023 to Examiners Rule 86-2 Report mailed Sep. 20, 2022", 13 pgs.
"Canadian Application Serial No. 3,140,014, Response filed Oct. 25, 2023 to Examiners Rule 86(2) Report mailed Jul. 17, 2023", 25 pgs.
"Canadian Application Serial No. 3,140,149, Examiners Rule 86(2) Report mailed Mar. 13, 2024", 7 pgs.
"Canadian Application Serial No. 3,140,149, Examiners Rule 86(2) Requisition mailed Feb. 27, 2023", 3 pgs.
"Canadian Application Serial No. 3,140,149, Office Action mailed Aug. 29, 2022", 3 pgs.
"Canadian Application Serial No. 3,140,149, Response filed Jun. 8, 23 to Examiners Rule 86(2) Requisition mailed Feb. 27, 2023", 33 pgs.
"Canadian Application Serial No. 3,140,149, Response filed Dec. 15, 2022 to Office Action mailed Aug. 29, 2022", 34 pgs.
"Canadian Application Serial No. 3208736, Voluntary Amendment filed Mar. 18, 2024", 7 pgs.
"Chinese Application Serial No. 202080053739.2, Office Action mailed Nov. 29, 2023", w/ English Translation, 27 pgs.
"Chinese Application Serial No. 202080053751.3, Office Action mailed Feb. 27, 2024", w/ English translation, 29 pgs.
"Chinese Application Serial No. 202080053751.3, Office Action mailed Mar. 9, 2023", W/English Translation, 31 pgs.
"Chinese Application Serial No. 202080053751.3, Office Action mailed Sep. 14, 2023", w/ English Translation, 26 pgs.
"Chinese Application Serial No. 202080053751.3, Response filed Aug. 3, 2023 to Office Action mailed Mar. 9, 2023", w/ English claims, 11 pgs.
"Chinese Application Serial No. 202080053751.3, Response filed Dec. 26, 2023 to Office Action mailed Sep. 14, 2023", w/ English claims, 13 pgs.
"Enpurion EC-Electrocoagulation", enpurion https://enpurion.com/empurion-ec/, (Accessed on Feb. 9, 2021), 4 pgs.
"European Application Serial No. 20821949.3, Extended European Search Report mailed May 24, 2023", 11 pgs.
"European Application Serial No. 20821949.3, Response filed Dec. 5, 2023 to Extended European Search Report mailed May 24, 2023", 18 pgs.
"European Application Serial No. 20822476.6, Extended European Search Report mailed May 24, 2023", 10 pgs.

(56) References Cited

OTHER PUBLICATIONS

"European Application Serial No. 20822476.6, Response filed Dec. 5, 2023 to Extended European Search Report mailed May 24, 2023", 18 pgs.
"European Application Serial No. 20822476.6, Response to Communication pursuant to Rules 161(2) and 162 EPC filed Sep. 1, 2022", 24 pgs.
"European Application Serial No. 20821949.3, Response filed Mar. 31, 2022 to Communication Pursuant to Rules 161(1) & 162 EPC mailed", 11 pgs.
"International Application Serial No. PCT/US2020/037405, International Preliminary Report on Patentability mailed Dec. 23, 2021", 11 pgs.
"International Application Serial No. PCT/US2020/037405, International Search Report mailed Sep. 14, 2020", 2 pgs.
"International Application Serial No. PCT/US2020/037405, Written Opinion mailed Sep. 14, 2020", 9 pgs.
"International Application Serial No. PCT/US2020/037407, International Preliminary Report on Patentability mailed Dec. 23, 2021", 10 pgs.
"International Application Serial No. PCT/US2020/037407, International Search Report mailed Sep. 16, 2020", 2 pgs.
"International Application Serial No. PCT/US2020/037407, Written Opinion mailed Sep. 16, 2020", 8 pgs.
"International Application Serial No. PCT/US2021/064124, International Preliminary Report on Patentability mailed Sep. 14, 2023", 9 pgs.
"International Application Serial No. PCT/US2021/064124, International Search Report mailed Aug. 17, 2022", 2 pgs.
"International Application Serial No. PCT/US2021/064124, Written Opinion mailed Aug. 17, 2022", 7 pgs.
"International Application Serial No. PCT/US2022/051651, International Search Report mailed Mar. 28, 2023", 2 pgs.
"International Application Serial No. PCT/US2022/051651, Written Opinion mailed Mar. 28, 2023", 5 pgs.
"International Application Serial No. PCT/US2023/019295, International Search Report mailed Jul. 21, 2023", 2 pgs.
"International Application Serial No. PCT/US2023/019295, Written Opinion mailed Jul. 21, 2023", 9 pgs.
"International Application Serial No. PCT/US2023/025390, International Search Report mailed Sep. 20, 2023", 2 pgs.
"International Application Serial No. PCT/US2023/025390, Written Opinion mailed Sep. 20, 2023", 6 pgs.
"Japanese Application Serial No. 2021-573824, Final Notification of Reasons for Refusal mailed Apr. 4, 2023", w/ English Translation, 10 pgs.
"Japanese Application Serial No. 2021-573824, Final Notification of Reasons for Refusal mailed Sep. 5, 2023", w/ English Translation, 14 pgs.
"Japanese Application Serial No. 2021-573824, Notification of Reasons for Refusal mailed Dec. 20, 2022", w/ English Translation, 11 pgs.
"Japanese Application Serial No. 2021-573824, Response filed Mar. 15, 2023 to Notification of Reasons for Refusal mailed Dec. 20, 2022", w/ English claims, 9 pgs.
"Japanese Application Serial No. 2021-573824, Response filed Jul. 3, 2023 to Final Notification of Reasons for Refusal mailed Apr. 4, 2023", w/ English claims, 10 pgs.
"Japanese Application Serial No. 2021-573824, Response filed Dec. 1, 2023 to Final Notification of Reasons for Refusal mailed Sep. 5, 2023", W/English Claims, 9 pgs.
"Japanese Application Serial No. 2021573769, Notification of Reasons for Refusal filed Oct. 4, 2022", w/ English Translation, 6 pgs.
"Japanese Application Serial No. 2021573769, Response filed Dec. 22, 2022 to Notification of Reasons for Refusal filed Oct. 4, 2022", w/ English claims, 14 pgs.
"Ship Corrosion Protection Technology", Ha'erbin: Harbin Engineering University Press Abstract with English Translation, (Feb. 28, 2011), 10 pgs.
"Treatment Technologies for Per- and Polyfluoroalkyl Substances (PFAS)", Fact Sheet, (Sep. 2023), 4 pgs.
Al-Qodah, Zakaria, et al., "Combined electrocoagulation processes as a novel approach for enhanced pollutants removal: A state-of-the-art review", Science of the Total Environment 744, (2020), 14 pgs.
Bensadok, K, et al., "Electrocoagulation of cutting oil emulsions using aluminium plate electrodes", Journal of Hazardous Materials 152, (2008), 423-430.
Deng, Shubo, et al., "Removal of perflurooctanoate from surface water by polyaluminium choloride coagulation", Water Research vol. 45 Issue 4 1774-1780, (Feb. 2011), 5 pgs.
Dina, T Moussa, et al., "A comprehensive review of electrocoagulation for water treatment: Potentials and challenges", Journal of Environmental Management 186, (2017), 24-41.
Garg, Shafali, et al., "Remediation of water from per-/poly-fluoroalkyl substances (PFAS)-Challenges and perspectives", Journal of Environmental Chemical Engineering 9, (2021), 25 pgs.
Gobbi, Lorena C.A., et al., "Electrocoagulation with polarity switch for fast oil removal from oil in water emulsions", Journal of Environmental Management 213, (2018), 119-125.
Govindan, Kadarkarai, et al., "Electrocoagulants Characteristics and Application of Electrocoagulation for Micropollutant Removal and Transformation Mechanism", ACS Appl Mater. Interfaces 12, (2020), 1775-1788.
Hubert, Michel, et al., "Per- and polyfluoroalkyl substance (PFAS) removal from soil washing water by coagulation and flocculation", Water Research 249, (2023), 10 pgs.
Jizhou, L, et al., "Pretreatment of dyestuff wastewater by internal microelectrolysis", International Conference on Electric Technology and Civil Engineering, (2011), 4 pgs.
Kabdasli, I, et al., "Electrocoagulation applications for industrial wastewaters: a critical review", Environmental Technology Reviews, (Nov. 6, 2012), 45 pgs.
Kekedy-Nagy, Laszlo, et al., "Electroless Production of Fertilizer (Struvite) and Hydrogen from Synthetic Agricultural Wastewaters", Journal of the American Chemical Society J. Am. Chem. Soc 142, (2020), 15 pgs.
Kuokkanen, Ville, et al., "Recent Applictions of Electrocoagulation in Treatment of Water and Wastewater-A Review", Green and Sustainable Chemistry, (Jan. 2013), 34 pgs.
Lu, Xinyu, et al., "Adsorption behavior and mechanism of perfluorooctane sulfonate on nanosized inorganic oxides", Journal of Colloid and Interface Science vol. 474 pp. 199-205, (Jul. 15, 2016), 6 pgs.
Luba, Mateusz, et al., "Electrochemical Degradation of Industrial Dyes in Wastewater through the Dissolution of Aluminum Sacrificial Anode of Cu/Al Macro-Corrosion Galvanic Cell", Molecules (18) 4108, (Sep. 25, 2020), 17 pgs.
Malik, Qasim H, "Performance of alum and assorted coagulants in turbidity removal of muddy water", Applied Water Science, (2018), 4 pgs.
Merino, Nancy, et al., "Degradation and Removal Methods for Perfluoroalky and Polyfluoroalkyl Substances in Water", Environmental Engineering Science vol. 33, No. 9, (Sep. 1, 2016), 60 pgs.
Peng, Shuai, et al., "Iron-carbon galvanic cells strengthened anaerobic/anoxic/oxic process(Fe/C-A2O) for high-nitrogen/phosphorus and low-carbon sewage treatment", Science of the Total Environment 722, (2020), 13 pgs.
Pierozynski, Boguslaw, "Electrochemical Degradation of Phenol and Resorcinol Molecules through the Dissolution of Sacrificial Anodes of Macro-Corrosion Galvanic Cells", Water 10:770, (2018), 10 pgs.
Wei, V, et al., "Nutrient removal in an electrically enhanced membrane Bioreactor", Water Science & Technology, vol. 60, No. 12, (Dec. 1, 2009), 3159-3163.
Xiao, Feng, et al., "Mechanisms for removal of perfluorooctane sulfonate (PFOS) and perfluorooctanoate (PFOA) from drinking water by conventional enhances coagulation", Water Research vol. 47, Issue 1 pp. 49-56, (Jan. 1, 2013), 6 pgs.
Zhang, D Q, et al., "Adsorption of perfluoroalkyl and polyfluoroalkyl substances (PFASs) from aqueous solution—A review", Science of the Total Environment 694, (2019), 19 pgs.

(56) References Cited

OTHER PUBLICATIONS

Zhang, Mingkun, et al., "Aluminum-based electrocoagulation for residual fluoride removal during per-and polyfluoroalkyl substances (PFASs) wastewater treatment", Separation and Purification Technology vol. 308, (Mar. 2023), 7 pgs.

Zhang, Zhiming, et al., "Adsorption of perfluorooctanoic acid (PFOA) and perfluorooctanesulfonic acid (PFOS) by aluminum-based drinking water treatment residuals", Journal of Hazardous Materials Letters, (2021), 6 pgs.

"European Application Serial No. 21929411.3, Response to Communication pursuant to Rules 161(2) and 162 EPC filed Apr. 5, 2024", 19 pgs.

"Application Serial No. 17 533,522, Response filed Apr. 23, 2024 to Advisory Action mailed Mar. 8, 2024", 21 pgs.

"Application Serial No. 17 838,361, Non Final Office Action mailed Apr. 24, 2024", 7 pgs.

"Chinese Application Serial No. 202180097592.1, Office Action mailed Apr. 2, 2024", W English Translation, 22 pgs.

"Canadian Application Serial No. 3,208,736, Examiners Rule 86(2) Requisition mailed May 6, 2024", 5 pgs.

"Canadian Application Serial No. 3,140,014, Response filed May 27, 2024 to Examiners Rule 86(2) Report mailed Feb. 9, 2024", 25 pgs.

"Application Serial No. 17 838,361, Response filed Jun. 5, 2024 to Final Office Action mailed Apr. 24, 2024", 7 pgs.

"Canadian Application Serial No. 3,140,149, Response filed Jun. 7, 2024 to Examiners Rule 86(2) Report mailed Mar. 13, 2024", 38 pgs.

"International Application Serial No. PCT US2024 023323, Invitation to Pay Additional Fees mailed Jun. 14, 2024", 3 pgs.

\* cited by examiner

REMOVAL OF FLUOROALKYL COMPOUNDS FROM WATER USING GALVANIC CELL

CROSS-REFERENCE TO RELATED APPLICATIONS

This application claims the benefit of priority to U.S. Provisional Patent Application Ser. No. 63/457,215 filed Apr. 5, 2023, U.S. Provisional Patent Application Ser. No. 63/470,046 filed May 31, 2023, and U.S. Provisional Patent Application Ser. No. 63/544,328 filed Oct. 16, 2023, the disclosures of which are incorporated herein in its entirety by reference.

BACKGROUND

Perfluoroalkyl or polyfluoroalkyl substances (PFASs) embody a range of polyfluorinated alkyl substances including but not limited to carboxylic acids, alkyl sulfonates, alkyl sulfonamide compounds, and fluorotelemer compounds of differing carbon chain lengths and precursors thereof. PFASs have found use in a wide variety of applications including as a specialized fire-fighting product, or for impregnation or coating of textiles, leather and carpet, or for carpet cleaning compounds, as well as in aviation hydraulic fluids, metal plating, agricultural (e.g., insect traps for certain types of ants), photo-imaging, electronics manufacture and non-stick cookware applications.

Higher order PFASs degrade to specific end-point PFAS chemicals including but not limited to perfluorooctane sulfonate (PFOS), perfluorooctanoic acid (PFOA) and perfluorohexane sulfonate (PFHxS). These compounds of concern are resistant to biotic or abiotic degradation and thus are persistent in the environment. They are recalcitrant, bioaccumulative and known to have contaminated soils, groundwaters and drinking water supplies.

PFASs are known to have contaminated groundwater, including drinking water supplies. PFOS, PFHxS, and PFOA have published human health and environmental regulatory criteria in most developed world jurisdictions. Additional PFASs are expected to be identified as contaminants of concern as new research toxicology data indicates potential risk associations. Conventional methods for removing PFASs from water and for destroying PFASs are inefficient.

SUMMARY OF THE INVENTION

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The method also includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Various aspects of the present invention provide a method of treating contaminated water. The method includes contacting the contaminated water including a fluoroalkyl compound with a galvanic cell to form galvanic cell-treated water including a foam including a galvanic cell-treated fluoroalkyl compound. The galvanic cell includes an anode including Al. The galvanic cell also includes a cathode having a different composition than the anode, wherein the cathode includes Cu. The method also includes removing the foam from the galvanic cell-treated water to form product water having a lower concentration of the fluoroalkyl compound than the contaminated water and to form removed foam having a higher concentration of the galvanic cell-treated water than the product water.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al. The galvanic cell also includes a cathode having a different composition than the anode, wherein the cathode includes Cu. The method includes adding a cationic polymer to the galvanic cell-treated water to form a complex including the galvanic cell-treated fluoroalkyl compound and the cationic polymer. The method also includes separating the complex from the galvanic cell-treated water to form product water having a lower concentration of the fluoroalkyl compound than the contaminated water and to form an aqueous concentrate having a higher concentration of the complex than the product water.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al. The galvanic cell also includes a cathode having a different composition than the anode, wherein the cathode includes Cu. The method includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water. The method also includes destroying the galvanic cell-treated fluoroalkyl compound in the aqueous concentrate, the destroying including thermal treatment, treatment with an electrolytic cell, plasma reactor, supercritical water, combustion, chemical treatment, or a combination thereof.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al. The galvanic cell includes a cathode having a different composition than the anode, wherein the cathode includes Cu. The method includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water. The method includes destroying the galvanic cell-treated fluoroalkyl compound in the aqueous concentrate, the destroying including treatment with an electrolytic cell including an electrochemical cathode and an electrochemical anode, wherein the electrolytic anode includes a metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, platinum, $PtO_2$, $MnO_2$, $CeO_2$, $Rh_2O_3$, carbon, or a combination thereof, wherein the electrolytic cathode includes Ti, Pt, Ni, stainless steel, carbon steel, Fc, Cu, Ag, carbon, or a combination thereof.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The method includes adding a metal component including a metal (e.g., an ion of the metal, a solid or dissolved compound of the metal, an elemental form of the metal, or a combination thereof) to the contaminated water prior to or during contacting of the contaminated water and the galvanic cell, wherein the metal of the metal component is the same as a metal in one or more electrodes of the galvanic cell. The method also includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al, and a cathode having a different composition than the anode, wherein the cathode includes Cu. The method includes adding aluminum ions and/or aluminum hydroxide to the contaminated water prior to or during contacting of the contaminated water and the galvanic cell, wherein the aluminum ions and/or aluminum hydroxide added to the contaminated water are aluminum ions and/or aluminum hydroxide generated formed by the aluminum anode of the galvanic cell during a previous cycle of contacting of the contaminated water with the galvanic cell. The method also includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al, and a cathode having a different composition than the anode, wherein the cathode includes Cu. The method includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water. The method includes acidifying the aqueous concentrate. The method includes performing a secondary separation to separate a residual solution from the aqueous concentrate after the acidification and to concentrate the galvanic cell-treated fluoroalkyl compound in the aqueous concentrate. The method also includes adding aluminum ions from the residual solution to the contaminated water prior to or during contacting of the contaminated water and the galvanic cell, wherein the aluminum ions added to the contaminated water are aluminum ions generated by the aluminum anode of the galvanic cell during a previous cycle of contacting of the contaminated water with the galvanic cell.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al, and a cathode having a different composition than the anode, wherein the cathode includes Cu. The method includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water. The method includes acidifying the aqueous concentrate. The method includes separating from the acidified aqueous concentrate a liquid including aluminum ions and/or aluminum hydroxide. The method includes purging one or more acidification contaminants from the liquid including the aluminum ions and/or aluminum hydroxide. The method also includes adding the liquid including the aluminum ions and/or aluminum hydroxide to the contaminated water prior to or during contacting of the contaminated water and the galvanic cell, wherein the aluminum ions and/or aluminum hydroxide added to the contaminated water are aluminum ions and/or aluminum hydroxide generated by the aluminum anode of the galvanic cell during a previous cycle of contacting of the contaminated water with the galvanic cell.

Various aspects of the present invention provide a method of treating contaminated water. The method includes contacting the contaminated water including a fluoroalkyl compound with a galvanic cell to form galvanic cell-treated water including a galvanic cell-treated fluoroalkyl compound. The galvanic cell includes an anode including Al, and a cathode having a different composition than the anode, wherein the cathode includes Cu. The method includes separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water. The method includes acidifying the aqueous concentrate. The method includes destroying the galvanic cell-treated fluoroalkyl compound in the acidified aqueous concentrate to form a liquid including a metal component. The method includes purging one or more acidification contaminants from the liquid including the metal component. The method includes recycling the metal component including combining the contaminated water and the liquid comprising the metal component prior to or during the contacting of the contaminated water and the galvanic cell, wherein the metal component in the liquid including the metal component added to the contaminated water includes aluminum ions, a solid or dissolved compound of aluminum, elemental aluminum, or a combination thereof, wherein the aluminum of the metal component is generated by the aluminum anode of the galvanic cell during a previous cycle of contacting of the contaminated water with the galvanic cell.

Various aspects of the method of the present invention provide certain advantages over other methods of treating water. For example, in various aspects, the method of the present invention can remove fluoroalkyl compounds from water more efficiently than other methods. In various aspects, the method of the present invention can remove fluoroalkyl compounds from water with greater effectiveness than other methods. In various aspects, the method of the present invention can remove fluoroalkyl compounds while also removing phosphorus, organic compounds, other contaminants, emulsions, or a combination thereof, thereby removing multiple contaminants in fewer steps and with greater efficiency than other methods. In various aspects, the method of the present invention can produce an aqueous concentrate containing the galvanic cell-treated fluoroalkyl compound having a higher concentration than that produced by other methods, which can provide a more efficient destruction of the fluoroalkyl compound with treatment of a smaller volume of liquid or solid than other methods. In various aspects, the method of the present invention can include addition of various oxidizers to the contaminated water prior to and/or during treatment with the galvanic cell, such as addition of hydrogen peroxide, sulfate salts, persulfate salts, or a combination thereof, which can enhance the removal of the fluoroalkyl compound from the contaminated water (e.g., via production of hydroxide radicals and/or sulfate radicals in the galvanic cell). In various aspects, the method of the present invention can include destroying the galvanic cell-treated fluoroalkyl compound via treatment in an electrolytic cell and can include addition of various oxidizers to the galvanic cell-treated fluoroalkyl compound prior to and/or during treatment with the electrolytic cell such as hydrogen peroxide, sulfate salts, persulfate salts, or a combination thereof, which can enable or enhance the destruction of the galvanic cell-treated fluoroalkyl compound (e.g., via production of hydroxide radicals and/or sulfate radicals in the electrolytic cell). In various aspects, sulfate radicals can be produced at the electrolytic cathode, such as from persulfates.

Various aspects of the present method can include adding a metal component including a metal (e.g., an ion of a metal, a solid or dissolved compound of the metal, an elemental form of the metal, or a combination thereof) to the contaminated water, wherein the metal of the metal component is the same as a metal produced by an electrode of the galvanic cell, or recycling a metal of a metal component producing during a previous cycle of contacting the galvanic cell and the contaminated water back into the contaminated water prior to or during contacting of the contaminated water with the galvanic cell during a subsequent cycle. A metal of a metal component produced by the galvanic cell can survive and be unaffected by a process of destroying the fluoroalkyl compounds, such as by electrolytic treatment, such that the metal of the metal component can be recycled back to the contaminated water. Addition and/or recycling the metal component can enhance of the efficiency of removal of the fluoroalkyl compounds from the contaminated water, can decrease a rate of degradation of electrodes in the galvanic cell, and can overall decrease costs and increase efficiency of the process. For example, addition of aluminum ions and/or aluminum hydroxide to the contaminated water or recycling of aluminum ions and/or aluminum hydroxide produced by the galvanic cell can increase an amount of aluminum hydroxide in the contaminated water during contacting with the galvanic cell which can increase a rate of removal of fluoroalkyl compounds from the contaminated water.

Various aspects of the present method include performing a secondary separation after acidification of the aqueous concentrate to separate a residual solution from the aqueous concentrate and thereby concentrate the galvanic cell-treated fluoroalkyl compound in the aqueous concentrate. By concentrating the galvanic cell-treated fluoroalkyl compound, the volume of water produced containing the galvanic cell-treated fluoroalkyl compound is decreased, enabling later processes for destruction of the galvanic cell-treated fluoroalkyl compound to process a smaller overall quantity of water to destroy the same amount of galvanic cell-treated fluoroalkyl compound and thereby be more efficient.

Various aspects of the present method can include purging acidification contaminants prior to recycling the metal component back to the contaminated water. By removing acidification contaminants, the build-up of the acidification contaminants in the recycle loop of the system can be decreased or entirely avoided.

BRIEF DESCRIPTION OF THE FIGURES

The drawings illustrate generally, by way of example, but not by way of limitation, various aspects of the present invention.

DETAILED DESCRIPTION OF THE INVENTION

Figure 1:
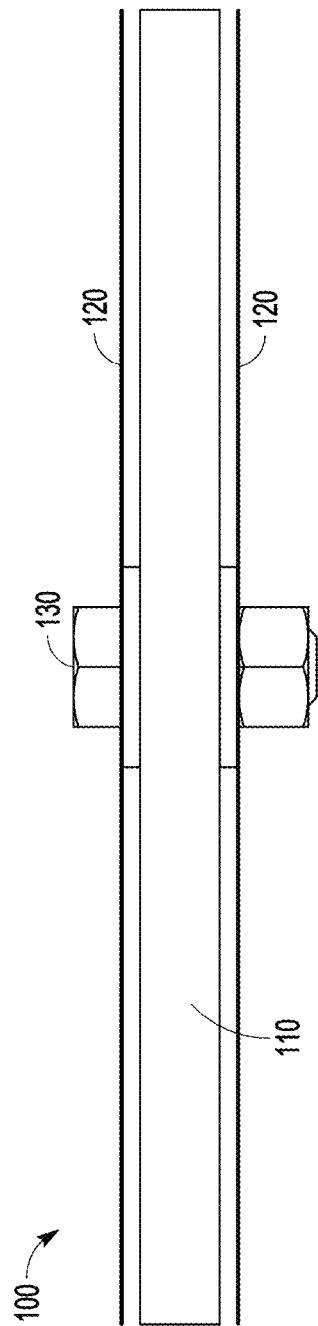
FIG. 1 illustrates a side-view of a galvanic cell including an anode that is a plate or strip, two cathodes that are screens, and a conductive connective maintaining a gap therebetween, in accordance with various aspects.

Reference will now be made in detail to certain aspects of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in a specific order as recited herein. Alternatively, in any aspect(s) disclosed herein, specific acts may be carried out in any order without departing from the principles of the invention, except when a temporal or operational sequence is explicitly recited. Furthermore, specified acts can be carried out concurrently unless explicit claim language recites that they be carried out separately or the plain meaning of the claims would require it. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a molecule having at least one repeating unit and can include copolymers.

Method of Treating Contaminated Water.

Various aspects of the present invention provide a method of treating contaminated water. The method can include contacting the contaminated water including a fluoroalkyl compound with a galvanic cell to form galvanic cell-treated water. The galvanic cell-treated water includes a galvanic cell-treated fluoroalkyl compound. The method can include separating the galvanic cell-treated fluoroalkyl compound from the galvanic cell-treated water to form product water and an aqueous concentrate. The product water has a lower concentration of the fluoroalkyl compound than the contaminated water. The aqueous concentrate has a higher concentration of the galvanic cell-treated fluoroalkyl compound than the product water.

The contaminated water can include one or more fluoroalkyl compound. The fluoroalkyl compound can be any suitable fluoroalkyl compound. The fluoroalkyl compound can be a perfluoroalkyl or polyfluoroalkyl substance (PFAS), perfluoroalkyl substance, a polyfluoroalkyl substance, a perfluoroalkyl acid (PFAA), or a combination thereof. The fluoroalkyl compound can be perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof. The contaminated water can have any suitable concentration of the one or more fluoroalkyl compounds, such as a concentration of 14 parts per trillion (ppt) or higher, or 4 ppt or higher, or 1 part per trillion (ppt) to 100 parts per million (ppm), 20 ppt to 1 ppm, or less than or equal to 100 ppm and greater than or equal to 1 ppt and less than, equal to, or greater than 2 ppt, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, 90, 100, 150, 200, 250, 300, 400, 500, 750, 1 ppm, 2, 4, 6, 8, 10, 15, 20, 25, 30, 35, 40, 45, 50, 60, 70, 80, or 90 ppm.

The contaminated water can have any suitable source. For example, the contaminated water can be an extract from contaminated soil, an extract from contaminated landfill materials, water contaminated with residual fire-fighting foam, industrial waste water (e.g., residues from the manufacture of water-repellant coatings or the application of those material to fabric or other surfaces, residues from the manufacture of non-stick coatings and from the application thereof, residue from semiconductor manufacture, residue from pesticide manufacture, residue from paint manufacture, residue from photography or a combination), thereof.

The galvanic cell-treated fluoroalkyl compound can include an oxidation product of the fluoroalkyl compound, a complex formed between the fluoroalkyl compound and one or more ions formed by the galvanic cell, a reaction product of the fluoroalkyl compound and one or more ions formed by the galvanic cell, a degradation product of the fluoroalkyl compound, or a combination thereof. The product water can have any suitable concentration of the galvanic cell-treated fluoroalkyl compound, such as less than 100 ppt, or 0.001 ppt to 100 ppt, or 0.001 ppt to 14 ppt, or 0.001 ppt to 4 ppt, or less than or equal to 100 ppt and greater than or equal to 0 ppt and less than, equal to, or greater than 1 ppt, 2, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, or 90 ppt. The product water can have a concentration of the galvanic cell-treated fluoroalkyl compound of 1 part per trillion (ppt) to 100 parts per million (ppm), 20 ppt to 1 ppm, or less than or equal to 100 ppm and greater than or equal to 1 ppt and less than, equal to, or greater than 2 ppt, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, 90, 100, 150, 200, 250, 300, 400, 500, 750, 1 ppm, 2, 4, 6, 8, 10, 15, 20, 25, 30, 35, 40, 45, 50, 60, 70, 80, or 90 ppm (e.g., in various aspects, the product water can include degradation products or reaction products of the fluoroalkyl compound).

The product water can have a concentration of the fluoroalkyl compound and/or the galvanic cell treated fluoroalkyl compound that is 0% to 20% of the concentration of the fluoroalkyl compound in the contaminated water, or 0.0001% to 5% of the concentration of the fluoroalkyl compound in the contaminated water, or less than or equal to 20% and greater than or equal to 0% and less than, equal to, or greater than 0.0001%, 0.0005, 0.001, 0.005, 0.01, 0.05, 0.1, 0.5, 1, 1.5, 2, 2.5, 3, 3.5, 4, 4.5, 5, 6, 7, 8, 9, 10, 11, 12, 13, 14, 15, 16, 17, 18, or 19%. The product water can have a concentration of the fluoroalkyl compound of less than 100 ppt, or 0.001 ppt to 100 ppt, or 0.001 ppt to 14 ppt, or 0.001 ppt to 4 ppt, or less than or equal to 100 ppt and greater than or equal to 0 ppt and less than, equal to, or greater than 1 ppt, 2, 3, 4, 5, 6, 7, 8, 9, 10, 11, 12, 13, 14, 15, 16, 17, 18, 19, 20, 22, 24, 26, 28, 30, 35, 40, 45, 50, 60, 70, 80, or 90 ppt.

The contacting of the galvanic cell and the contaminated water can be performed in any apparatus. For example, the contacting of the galvanic cell and the contaminated water can be performed in a tank, in a plug-flow reactor, or a combination thereof.

The galvanic cell can be any suitable type of galvanic cell. The galvanic cell includes an anode and a cathode. The galvanic is free of any externally-applied potential across the anode and the cathode. The anode can include Mg, Al, Fe, Zn, Cu, Cd, Cr, Hg, Ni, V, Ce, or a combination thereof. The anode can include Al or an Al alloy, and can be, for example, 90 wt % to 100 wt % Al (e.g., less than or equal to 100 wt % and greater than or equal to 90 wt % and less than, equal to, or greater than 91%, 92, 93, 94, 95, 96, 97, 98, or 99 wt %). The cathode has a different composition than the anode and can include Al, Zn, Fe, Cd, Ni, Sn, Pb, Cu, Ag, Co, Mn, Pd, Ag, carbon (e.g., BDD, graphite, graphene, or a combination thereof), or a combination thereof. The cathode can include Cu or a Cu alloy, and can be, for example, 90 wt % to 100 wt % Cu (e.g., less than or equal to 100 wt % and greater than or equal to 90 wt % and less than, equal to, or greater than 91%, 92, 93, 94, 95, 96, 97, 98, or 99 wt %). The cathode can include Mg, such as 90 wt % to 100 wt % Mg (e.g., less than or equal to 100 wt % and greater than or equal to 90 wt % and less than, equal to, or greater than 91%, 92, 93, 94, 95, 96, 97, 98, or 99 wt %). The galvanic cell can include an anode including Al and a cathode including Cu. The galvanic cell can include an anode including Al and a cathode including Mg. In various aspects, the galvanic cell includes more than one of the anodes and not more than one of the cathodes. In other aspects, the galvanic cell includes a plurality of the anodes and a plurality of the cathodes.

The anode and the cathode of the galvanic cell can have any suitable physical form. For example, the anode and the cathode can independently include a rod, a bar, a tube, a sheet, a plate, an inclined plate, a strip, a non-porous material, a porous material, a screen, a wire mesh, or a combination thereof. The anode and cathode can independently be rods, bars, or a combination thereof. The anode can be a strip or plate, and the cathode can be a porous material. The porous material can include a screen, a wire mesh, or a combination thereof. The anode and the cathode can physically contact one another. The anode and the cathode can include a gap therebetween, wherein the gap is 1 mm to 110 mm, or 2 mm to 30 mm, or less than or equal to 110 mm and greater than or equal to 1 mm and less than, equal to, or greater than 2 mm, 3, 4, 5, 6, 7, 8, 9, 10, 12, 14, 16, 18, 20, 22, 24, 26, 28, 30, 35, 40, 45, 50, 60, 70, 80, 90, or 100 mm. In various aspects, the anode and the cathode include a gap therebetween but contact one another in other locations. In various aspects, the anode and the cathode include a gap therebetween and are free of physical contact with one another (e.g., the gap represents the closest physical distance between the anode and the cathode).

FIG. 1 illustrates a side-view of a galvanic cell 100. The galvanic cell includes an anode 110, wherein the anode is a strip or a plate. The galvanic cell includes two cathodes 120 which are screens. The galvanic cell includes conductive connector 130 including a bolt, two washers (wherein each washer is between cathode 120 and anode 110), and a nut. The conductive connector 130 maintains a gap between the cathodes 120 and the anode 110.

Figure 2:
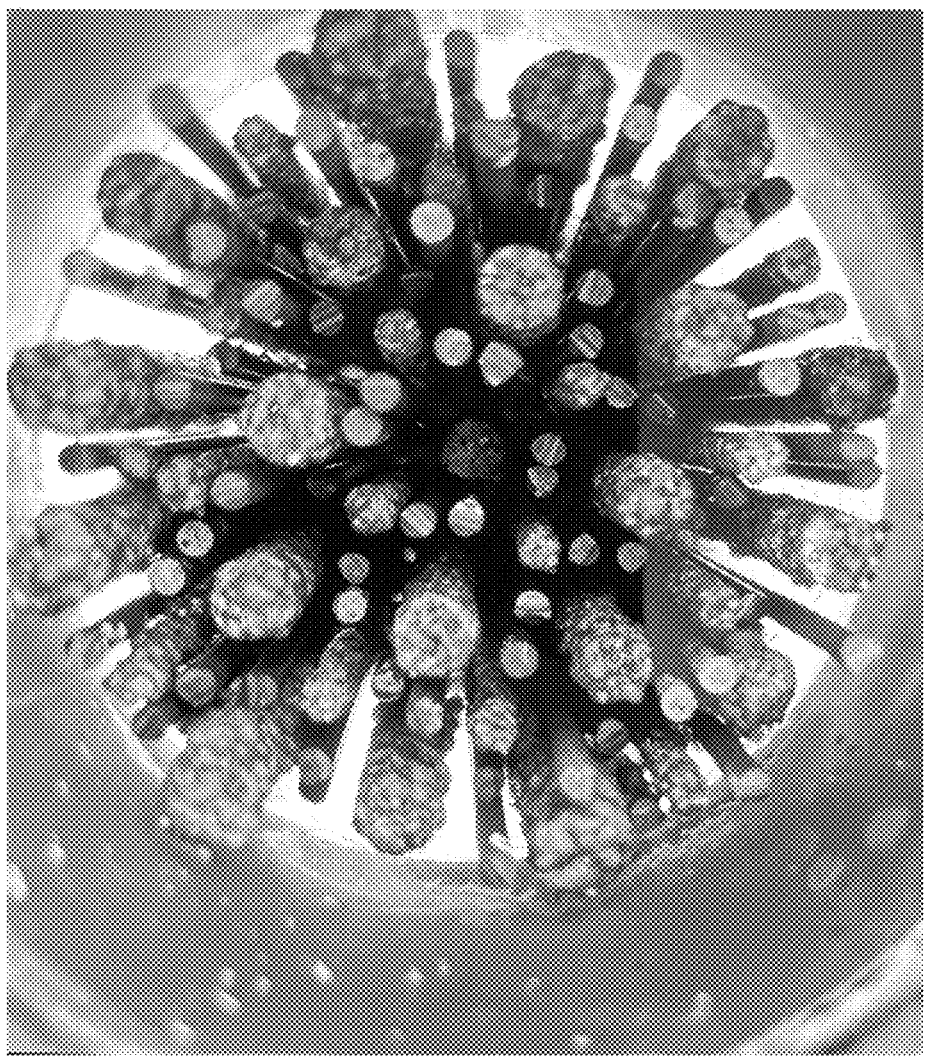
FIG. 2 illustrates a photograph showing an end of a galvanic cell in a tubular plug-flow reactor, illustrating anode and cathode rods, in accordance with various aspects.

FIG. 2 illustrates a photograph showing an end of a galvanic cell in a tubular plug-flow reactor. The photograph illustrates copper and aluminum rods. Some of the rods have a gap therebetween, while other rods are allowed to contact one another in various locations. Below the area of the photograph, the galvanic cell includes a stainless steel conductive connector in the shape of a flat puck or disc having holes therein running from one major face to the other major face that fit the rods maintain a gap between the rods at least at the location of the conductive connector.

Figure 3:
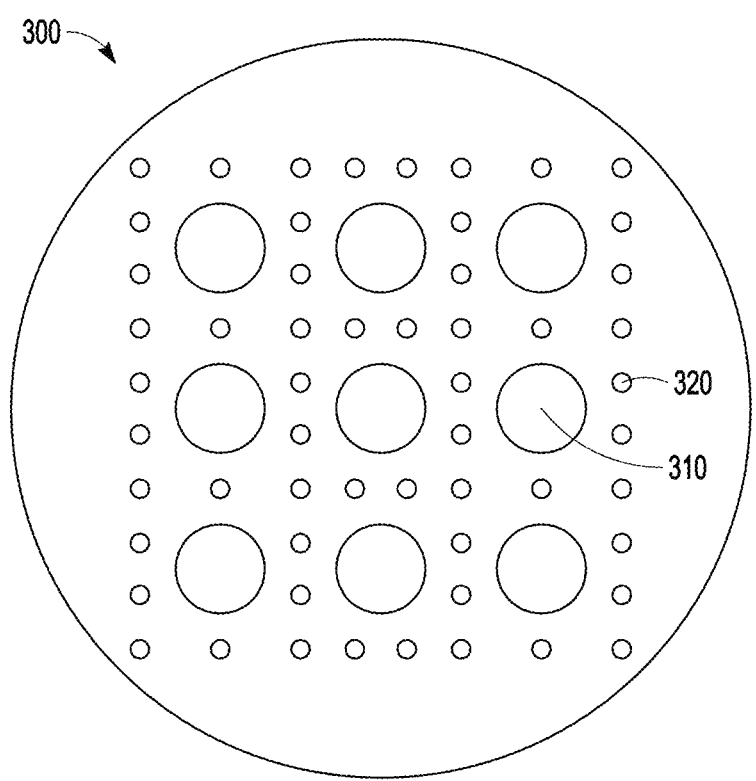
FIG. 3 illustrates schematic showing an end of a galvanic cell in a tubular plug-flow reactor, illustrating anode and cathode rods, in accordance with various aspects.

FIG. 3 illustrates schematic showing an end of a galvanic cell in a tubular plug-flow reactor, illustrating anode and cathode rods. FIG. 3 is a simplified schematic of the photograph shown in FIG. 2. FIG. 3 illustrates tubular reactor 300 having a galvanic cell therein that includes larger cathode rods 310 and smaller anode rods 320. The cathode rods 310 and the anode rods 320 include a gap therebetween.

The galvanic cell can be a tubular reactor including anode and cathode rods therein, such as aluminum rods and copper rods. The rods can be solid aluminum or copper, can be hollow rods of aluminum or copper, or can be solid or hollow rods coated or plated with aluminum or copper. The core of a plated or coated anode or cathode (e.g., the portion of the electrode underneath the plating or coating) can be any suitable electrically conductive material, such as copper, graphite, nickel, silver, titanium, brass, steel, carbon steel, stainless steel, or a combination thereof. The rods can be welded together at one or more locations along the length of the reactor. For example, the rods can be welded together at or near one or both ends of the reactor. In an example, the ends of the rods are welded together at one or both ends of the tubular reactor. The one or more welds at each location along the length of the reactor can be an electrically conductive connector that physically and electrically connects the anode and cathode rods. At the location of the weld, the anode and cathode rods can be physically contacting one another, can have a gap between one another, or a combination thereof. At locations along the length of the tubular reactor away from the one or more welds, the anode and cathode rods can be physically contacting one another, can have a gap between one another, or a combination thereof. Welds that include physical contact between anode and cathode rods can maintain contact of the rods such along a length of the reactor or proximate to the weld. Welds that include a gap between anode and cathode rods can maintain a gap between the anode and cathode, such as along a length of the reactor or proximate to the weld. Tubular reactors with a weld that includes a gap between anode and cathode rods can include contact between the anode and cathode rods at one or more locations along the length of the reactor, such as at one or more locations away from the weld.

The anode and/or cathode can be free of plated coatings of deposited metals thereon. In other aspects, the anode and/or cathode includes a plating and/or deposition thereon including Mg, Al, Fe, Zn, Cu, Cd, Cr, Hg, Ni, V, Ce, Sn, Pb, Ag, Co, Mn, Pd, Mo, carbon (e.g., BDD, graphite, graphene, or a combination thereof), or a combination thereof. A plating can be a continuous coating of the metal thereon. A deposition (e.g., chemical vapor deposition, physical vapor deposition, electrodeposition, electroless deposition, chemical reduction, or a combination thereof) can form a discontinuous coating of the deposited metal thereon. For example, in electroless deposition, a solution of the desired metal ion can be contacted for a brief period (e.g., 30 sec to 1 min) with the anode or the cathode such that the metal ion is deposited onto the surface of the contacted electrode. In various aspects, the anode can include a plating or deposition of a metal thereon, wherein the plated and/or deposited metal is a cathode or is the cathode; the deposited or plated cathode on the anode can be the only cathode in the galvanic cell (e.g., an electroless configuration), or the galvanic cell can further include another cathode that is not plated or deposited on the anode and that includes Al, Zn, Fe, Cd, Ni, Sn, Pb, Cu, Ag, Co, Mn, Pd, Ag, carbon (e.g., BDD, graphite, graphene, or a combination thereof), or a combination thereof. In various aspects, the anode includes Cu plated and/or deposited onto a surface thereof, wherein the cathode includes Cu and wherein the cathode is not plated or deposited on the anode including Al. The core of a plated or coated anode or cathode (e.g., the portion of the electrode underneath the plating or coating) can be any suitable electrically conductive material, such as copper, graphite, nickel, silver, titanium, brass, steel, carbon steel, stainless steel, or a combination thereof.

In various aspects, the galvanic cell can include a conductive connector. The conductive connector can physically and electrically connect the anode and the cathode. The conductive connector can maintain a gap between the anode and the cathode (e.g., the conductive connector can hold the anode and the cathode apart to maintain the gap therebetween), or the conductive connector can hold the anode and the cathode in contact with one another. The conductive connector can include any suitable electrically conductive material. The conductive connector can include Cu, Zn, Fe, Cd, Ni, Sn, Pb, or a combination thereof. The conductive connector can include brass, stainless steel, or a combination thereof. The conductive connector can include any suitable physical form, such as a weld, a fastener, a fastener assembly, a threaded fastener, a screw, a bolt, a bracket, a nut, a washer, or a combination thereof. The anode and cathode can include one or more suitably-sized through-holes to allow the conductive connector to pass therethrough (e.g., holes for a fastener, screw, or bolt).

The galvanic cell can include a nonconductive connector that physically connects the anode and the cathode but that does not provide an electrical connection between the anode and the cathode. The nonconductive connector can include any suitable non-electrically conductive material, such as plastic, glass, rubber, or a combination thereof, and/or wherein the nonconductive connector includes a conductive connector coated with a non-conductive material. The nonconductive connector includes a weld, a fastener, a fastener assembly, a threaded fastener, a screw, a bolt, a bracket, a nut, a washer, or a combination thereof. In various aspects, the galvanic cell includes no conductive connectors or nonconductive connectors. In various aspects, the galvanic cell includes conductive connectors but is free of nonconductive connectors. In various aspects, the galvanic cell includes nonconductive connectors and is free of conductive connectors. In various aspects, the galvanic cell includes a combination of conductive connectors and nonconductive connectors.

The method can be free of treating the contaminated composition with added UV light. In other aspects, the method can further include treating the contaminated composition with UV light before or during the contacting of the contaminated composition with the galvanic cell. The UV light can be any suitable UV light, such as including a wavelength of less than 254 nm, such as a wavelength of 150 nm to less than 254 nm, or 180 nm to 220 nm, or less than 254 nm and greater than or equal to 150 nm and less than, equal to, or greater than 152, 154, 156, 158, 160, 162, 164, 166, 168, 170, 172, 174, 176, 178, 180, 181, 182, 183, 184, 185, 186, 187, 188, 189, 190, 192, 194, 196, 198, 200, 201, 202, 203, 204, 205, 206, 207, 208, 209, 210, 212, 214, 216, 218, 220, 225, 230, 235, 240, 245, or 250 nm. The UV light can include light having a wavelength of about 185 nm and/or about 204 nm. The UV light can be applied from bulbs that are located within a reactor the includes the galvanic cell, or that are located upstream and/or downstream of the galvanic cell. A galvanic cell that includes a UV light source can include the UV light source in the cell such that the light source is immersed, or the galvanic cell can be in a UV-transparent enclosure and include one or more UV sources exterior to the enclosure that shine UV light into the enclosure wherein contaminated water is flowed and treated by the galvanic cell and UV light.

The aqueous concentrate can be any suitable aqueous concentrate that has a higher concentration of the galvanic cell-treated fluoroalkyl compound than the product water. The aqueous concentrate can include an extract, a foam, a filtration residue, a separated sediment, a slurry, a sludge, a wet precipitate, or a combination thereof. In various aspects, the contacting of the galvanic cell and the contaminated water can produce a precipitate that can include materials produced by the electrolytic anode and/or electrolytic cathode, wherein the precipitate can absorb the galvanic cell-treated fluoroalkyl compound. For example, a Cu/Al galvanic cell can produce aluminum hydroxide precipitate that can include the galvanic cell-treated fluoroalkyl compound, and separation of the precipitate from the galvanic cell-treated water can provide the aqueous concentrate. The aqueous concentrate can include a metal component including a metal (e.g., an ion of the metal, a solid or dissolved compound of the metal, an elemental form of the metal, or a combination thereof), wherein the metal of the metal component is formed from an electrode of the galvanic cell. For example, the aqueous concentrate can include an aluminum ion (e.g., $Al^{3+}$) or aluminum hydroxide formed from an aluminum anode of the galvanic cell. In various aspects, the method can further include recycling the metal of the metal component from the aqueous concentrate, the recycling including combining the metal component and the contaminated water prior to contacting the contaminated water and the galvanic cell.

The method can further include destroying the galvanic cell-treated fluoroalkyl compound in the aqueous concentrate. The destroying can include destroying 60 wt % to 100 wt % of the galvanic cell-treated fluoroalkyl compound in the aqueous concentrate, or 95 wt % to 100 wt % of the galvanic cell-treated fluoroalkyl compound in the aqueous concentrate, or less than or equal to 100 wt % and greater than or equal to 60 wt % and less than, equal to, or greater than 62 wt %, 64, 66, 68, 70, 72, 74, 76, 78, 80, 82, 84, 86, 88, 90, 91, 92, 93, 94, 95, 96, 97, 98, 99, 99.5, 99.9, or 99.99 wt %. Destroying the galvanic cell-treated fluoroalkyl compound can include mineralizing the galvanic cell-treated fluoroalkyl compound (e.g., into $CO_2$ and fluoride ions). Fluoride ions can form salts with other available ions, such as metal ions. In various aspects, the fluoride ions can form salts with aluminum ions.

The destroying of the galvanic cell-treated fluoroalkyl compound in the aqueous concentrate can be performed in any suitable way. For example, the destroying of the galvanic cell-treated fluoroalkyl compound can include thermal treatment, treatment with an electrolytic cell, plasma reactor, supercritical water, combustion, chemical treatment (e.g., treatment with dimethylsulfoxide, acid, base, or a combination thereof, such as sulfuric acid, hydrochloric acid, or acid piranha solution, or such as potassium t-butoxide, sodium hydroxide, base piranha solution, or a combination thereof), or a combination thereof. Acid piranha solution can include a mixture of sulfuric acid and hydrogen peroxide, such as about 70% of 98% $H_2SO_4$ and about 30% of 30% $H_2O_2$. Basic piranha solution can include an approximately 3:1 mixture of ammonia solution (e.g., $NH_4OH$ and/or $NH_3$) and hydrogen peroxide.

In various aspects, the destroying the galvanic cell-treated fluoroalkyl compound can produce a solid including the destroyed fluoroalkyl compound and a liquid including dissolved metal component including a metal from an electrode of the galvanic cell, such as during destroying that includes treatment with an electrolytic cell. The method can further includes separating the liquid and the solid (e.g., via filtration or other methods) and recycling the metal of the metal component back into the method. Recycling the metal of the metal component can include combining the metal component and the contaminated water prior to contacting the contaminated water and the galvanic cell. For example, an aqueous concentrate produced from a galvanic cell including an aluminum anode and a copper cathode can include aluminum ions that are dissolved in the aqueous concentrate during and after treatment of the aqueous concentrate with an electrolytic cell. In various aspects, after treatment with the galvanic cell and prior to treatment with the electrolytic cell, the aqueous concentrate can be treated with acid to lower the pH thereof to 0.5-5 or 1-4, which can cause a majority of aluminum present in the aqueous concentrate to be dissolved and in the form of ions (e.g., $Al^{3+}$ ions). Prior to any basification of the product of treatment of the electrolytic cell, the liquid containing the dissolved aluminum ions can be separated from solids, and the liquid can be combined with contaminated water entering the galvanic cell, thereby recycling the aluminum ions.

The method can further include removing water from the aqueous concentrate to form a dried contaminant composition including the galvanic cell-treated fluoroalkyl compound. Destroying the galvanic cell-treated fluoroalkyl compound in the aqueous concentrate can include destroying the galvanic cell-treated fluoroalkyl compound in the dried contaminant composition.

The destroying of the galvanic cell-treated fluoroalkyl compound can include thermal treatment. The thermal treatment can include heating to a thermal treatment temperature of 1000° C. to 5000° C., or 1400° C. to 2000° ° C., or 1500° C. or higher, or less than or equal to 5000° C. and greater than or equal to 1000° C. and less than, equal to, or greater than 1100° ° C., 1200, 1300, 1400, 1450, 1500, 1550, 1600, 1650, 1700, 1750, 1800, 1850, 1900, 1950, 2000, 2250, 2500, 2750, 3000, 3500, 4000, or 4500° C. The thermal treatment can include maintaining the galvanic cell-treated fluoroalkyl compound at the treatment temperature for a duration of 0.1 sec to 24 h, or less than or equal to 24 h and greater than or equal to 0.1 sec and less than, equal to, or greater than 0.5 sec, 1, 2, 4, 6, 10, 20, 30, 40, 50 sec, 1 min, 1.5, 2, 2.5, 3, 4, 5, 10, 15, 20, 30, 40, 50 min, 1 h, 1.5, 2, 3, 4, 5, 6, 8, 10, 12, 14, 16, 18, 20, or 22 h.

The destroying of the galvanic cell-treated fluoroalkyl compound can include treatment with an electrolytic cell including an electrolytic anode and an electrolytic cathode. The method can include treating the galvanic cell-treated fluoroalkyl compound with the electrolytic cell for a duration of 1 sec to 24 h, 50 min to 200 min, or less than or equal to 24 h and greater than or equal to 1 sec and less than, equal to, or greater than 0.5 sec, 1, 2, 4, 6, 10, 20, 30, 40, 50 sec, 1 min, 1.5, 2, 2.5, 3, 4, 5, 10, 15, 20, 30, 40, 50, 60, 70, 80, 90, 100, 110, 120, 130, 140, 150, 160, 170, 180, 190, 200 min, 4 h, 5, 6, 8, 10, 12, 14, 16, 18, 20, or 22 h. The electrolytic anode can include any suitable anode material, such as an inert anode material that does not suffer or is resistant to corrosion at high anodic potentials, such as a metal oxide, a transition metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof. For example, the electrolytic anode can include $RuO_2$ and $IrO_2$, or can include $PbO_2$ and $Bi_2O_3$ (e.g., lead oxide doped with bismuth), or can include $IrO_2$, $RuO_2$, $PtO_2$, and $Rh_2O_3$. The electrolytic anode can be a dimensionally stable anode (DSA). The electrolytic anode can be formed entirely of the anode material (e.g., and can be free of catalyst coatings) or the electrolytic anode can include a coating or deposition of the anode material (e.g., as a catalyst coating) on a suitable substrate such as titanium, stainless steel, carbon steel, carbon (e.g., BDD, graphite, graphene, or a combination thereof), or a combination thereof. The catalyst coating can be on major face of the electrolytic anode or on both major faces. The electrolytic cathode can include any suitable cathode material, such as titanium, stainless steel, carbon steel, Pt, Ni, Fe, Cu, Ag, carbon (e.g., BDD, graphite, graphene, or a combination thereof), or a combination thereof. The electrolytic cathode can be formed entirely of the cathode material (e.g., and can be free of catalyst coatings) or the electrolytic cathode can include a coating or deposition of the cathode material (e.g., as a catalyst coating) on a suitable substrate, such as a substrate that includes titanium, stainless steel, carbon steel, Pt, Ni, Fe, Cu, Ag, carbon (e.g., BDD, graphite, graphene, or a combination thereof), or a combination thereof. The electrolytic cathode can include a graphite substrate that includes a catalyst coating that includes copper. The catalyst coating can be on major face of the electrolytic cathode or on both major faces. The treatment with the electrolytic cell can include applying a sufficient voltage across the electrolytic anode and the electrolytic cathode to generate a current density in the electrolytic cell of 5-500 $mA/cm^2$, or 10-40 $mA/cm^2$, or less than or equal to 500 $mA/cm^2$ and greater than or equal to 5 $mA/cm^2$ and less than, equal to, or greater than 10, 15, 20, 25, 30, 35, 40, 50, 60, 80, 100, 120, 140, 160, 180, 200, 220, 240, 260, 280, 300, 350, 400, or 450 $mA/cm^2$.

The treatment of the galvanic cell-treated fluoroalkyl compound with the electrolytic cell can include contacting an aqueous composition that includes the galvanic cell-treated fluoroalkyl compound with the electrolytic cell. The aqueous composition can include the aqueous concentrate. The aqueous composition can be the aqueous concentrate, or the aqueous composition can include the aqueous composition and also include added water. The treatment with the electrolytic cell can further include adjusting a pH of the aqueous composition before or during contacting of the aqueous composition with the electrolytic cell, such as adjusting the pH to 1 to 4, or 2.0 to 2.5, or less than or equal to 4 and greater or equal to 1 and less than, equal to, or greater than 1.2, 1.4, 1.6, 1.9, 2, 2.1, 2.2, 2.3, 2.4, 2.5, 2.6, 2.8, 3, 3.2, 3.4, 3.6, or 3.8. The pH adjustment can be performed by adding one or more acids to the aqueous composition, such as HCl, $H_2SO_4$, or a combination thereof.

The aqueous composition can further include one or more added additives, such as any suitable additives, such as an acid, a buffer, a sulfate salt, a persulfate salt, an oxidizer, NaCl, KCl, or a combination thereof. The oxidizer can include ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof. The added additives can include $H_2SO_4$, HCl, $K_2SO_4$, $Na_2SO_4$, $Na_2S_2O_8$, $KHSO_5$, $H_2O_2$, NaCl, KCl, or a combination thereof. The method can include combining the additive with the aqueous concentrate and/or the aqueous composition prior to and/or during the contacting of the aqueous composition with the electrolytic cell.

Destroying the galvanic cell-treated fluoroalkyl compound can further include acidifying the aqueous concentrate prior to the treatment with the electrolytic cell to bring a pH of the aqueous concentrate to a pH of 0.5-5, or 1-4, or less than or equal to 5 and greater than or equal to 0.5 and less than, equal to, or greater than 1, 1.5, 2, 2.5, 3, 3.5, 4, or 4.5. Acidifying the aqueous concentrate can be sufficient to dissolve a metal component including a metal (e.g., an ion of the metal, a dissolved or solid compound of the metal, an elemental form of the metal, or a combination thereof) in the aqueous concentrate formed from an electrode of the galvanic cell. The metal component can include an aluminum ion and/or aluminum hydroxide.

The treatment with the electrolytic cell can form an electrolytically-treated composition that includes a solid and a liquid. The liquid can include dissolved ions of the metal (e.g., dissolved aluminum ions from an aluminum anode of the galvanic cell). The method can further include separating the liquid and the solid and recycling the metal of the metal component including combining the contaminated water and the liquid including the metal component prior to or during contacting the contaminated water and the galvanic cell. In various aspects, the method further includes adding a base to the liquid separated from the solid (e.g., prior to adding the liquid to the contaminated water) to bring a pH of the liquid to 3-6, or less than or equal to 6 and greater than or equal to 3 and less than, equal to, or greater than 3.5, 4, 4.5, 5, or 5.5. In other aspects, no adjustment of pH is made prior to adding the liquid to the contaminated water. The solid (containing the destroyed fluoroalkyl compound) can be optionally further treated and then be disposed of. Further treatment can include basification to bring a pH thereof to 5.5-8, or 6.5-7, or less than or equal to 8 and greater than or equal to 5.5 and less than, equal to, or greater than 6, 6.5, 7, or 7.5.

In various aspects, the treatment with the electrolytic cell forms an electrolytically-treated composition including a solid and a liquid, and the method further includes adding a based to the electrolytically-treated composition to bring the pH of 5.5-8, or 6.5-7, or less than or equal to 8 and greater than or equal to 5.5 and less than, equal to, or greater than 6, 6.5, 7, or 7.5. Such basification can occur prior to any filtration and can cause the metal component dissolved in the electrolytically-treated composition to precipitate. The method can further include filtering the basified solution and optionally providing the liquid from the filtration back into the process, such as by addition to the contaminated water prior to or during treatment with the galvanic cell. The solids from the filtration (containing the destroyed fluoroalkyl compound) can optionally be further treated and then be disposed of.

The electrolytic anode and the electrolytic cathode can independently have any suitable physical form, such as a rod, screen, or a plate. The electrolytic anode and the electrolytic cathode can each have the form of a plate wherein each of the plates are arranged parallel to one another. The electrolytic anode plate and electrolytic cathode plate can independently have any suitable thickness, such as 0.1 mm to 50 mm, 1 mm to 30 mm, or less than or equal to 50 mm and greater than or equal to 0.1 mm, 0.5, 1, 2, 3, 4, 5, 6, 7, 8, 9, 10, 12, 14, 16, 18, 20, 25, 30, 35, 40, or 45 mm. The electrolytic anode plate and electrolytic cathode plate can have different thicknesses or the same thicknesses.

The electrolytic cell can include one or more bipolar electrodes positioned between the electrolytic anode and the electrolytic cathode. The electrolytic anode, the electrolytic cathode, and the bipolar electrodes can be each in the form of a plate that are arranged parallel to one another. The one or more bipolar plates can each independently have any suitable thickness, such as 0.1 mm to 50 mm, 1 mm to 30 mm, or less than or equal to 50 mm and greater than or equal to 0.1 mm, 0.5, 1, 2, 3, 4, 5, 6, 7, 8, 9, 10, 12, 14, 16, 18, 20, 25, 30, 35, 40, or 45 mm. The electrolytic anode plate, electrolytic cathode plate, and one or more bipolar electrodes can have different thicknesses or the same thicknesses.

The electrolytic anode, the electrolytic cathode, and the bipolar electrodes can be free of physical contact with one another, and wherein the electrolytic anode, the electrolytic cathode, and the bipolar electrodes can be free of electrical connection with one another other than an aqueous liquid in which the electrolytic cell is immersed (e.g., the aqueous concentrate) and an optional electrical potential applied across the electrolytic anode and the electrolytic cathode. The electrolytic cell can include a gap between the electrolytic anode and the bipolar electrodes (e.g., the nearest of the two or more bipolar electrodes) and a gap between the electrolytic cathode and the bipolar electrodes (e.g., the nearest of the two or more electrodes). The gaps can independently be any suitable size, such as 0.1 mm to 20 mm, 0.1 mm to 5 mm, or less than or equal to 20 mm and greater than or equal to 0.1 mm, 0.2, 0.3, 0.4, 0.5, 0.6, 0.8, 1, 1.2, 1.4, 1.6, 1.8, 2, 2.5, 3, 3.5, 4, 4.5, 5, 6, 7, 8, 9, 10, 12, 14, 16, or 18 mm. An electrolytic cell that includes more than one bipolar electrode can include a gap between the bipolar electrodes, such as a gap of 0.1 mm to 20 mm, 0.1 mm to 5 mm, or less than or equal to 20 mm and greater than or equal to 0.1 mm, 0.2, 0.3, 0.4, 0.5, 0.6, 0.8, 1, 1.2, 1.4, 1.6, 1.8, 2, 2.5, 3, 3.5, 4, 4.5, 5, 6, 7, 8, 9, 10, 12, 14, 16, or 18 mm.

The electrolytic cell can include one of the bipolar electrodes positioned between the electrolytic anode and electrolytic cathode. The electrolytic cell can include two or more, or three or more, of the bipolar electrodes positioned between the electrolytic anode and electrolytic cathode.

The electrolytic cell can include an electrically nonconductive connector that physically connects the electrolytic anode, electrolytic cathode, and optional one or more bipolar plates, to one another and that maintains gaps between the electrolytic anode and bipolar plates, between the bipolar plates, and between the bipolar plates and the electrolytic cathode. In various aspects, one or more nonconductive connectors can hold one or more of the electrolytic anode, electrolytic cathode, and optional one or more bipolar plates, together and/or in-place. For example, the electrolytic cell can include a non-conductive rod that passes through the bipolar plates and/or that passes through one or both of the electrolytic anode and electrolytic cathode. The non-conductive rod can be formed from any suitable material, such as a plastic, or such as a conductive material (e.g., metal such as stainless steel) that is coated or otherwise covered with a non-conductive material (e.g., rubber or plastic). The non-conductive rod can be a threaded rod onto which one or more nuts can be threaded to prevent the electrolytic anode, electrolytic cathode, and optional one or more bipolar plates, from sliding longitudinally along the rod. The one or more non-conductive rods can connect and maintain the gap between the electrolytic anode, the electrolytic cathode, and the optional one or more bipolar plates, and can hold multiple electrolytic cells together by passing therethrough.

The bipolar electrode can include titanium, stainless steel, carbon (e.g., BDD, graphite, graphene, or a combination thereof), or a combination thereof. The bipolar electrode can include Ti. The bipolar electrode can be free of coatings (e.g., the bipolar electrode can be formed substantially or entirely of titanium, stainless steel, carbon, or a combination thereof). The carbon can include BDD, graphite, graphene, or a combination thereof. The bipolar electrode can include a catalyst coating (e.g., a catalyst coating on a substrate including titanium, stainless steel, carbon, or a combination thereof). The catalyst coating can be on both major faces of the bipolar electrode or on one major face of the bipolar electrode. In various aspects, the bipolar electrodes can include the catalyst coating on one major face of each of the bipolar plates (e.g., the face that faces the nearest electrolytic cathode), wherein the other major face of each of the bipolar plates can be free of a catalyst coating (e.g., the face that faces the nearest electrolytic anode) or can include a catalyst coating having a different composition than the catalyst coating on the opposite face. The catalyst coating can include one or more transition metal oxides. The catalyst coating can include a metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof.

The destroying the galvanic cell-treated fluoroalkyl compound can include treatment with a plurality of the electrolytic cells. The plurality of the electrolytic cells can include 2 to 1,000 of the electrolytic cells, such as 2 of the electrolytic cells, or 3, 4, 5, 6, 7, 8, 9, 10, 11, 12, 13, 14, 15, 16, 17, 18, 19, or 20 or more of the electrolytic cells.

The electrolytic anode, electrolytic cathode, and bipolar electrodes can be a first electrolytic anode, a first electrolytic cathode, and first bipolar electrodes, wherein the destroying the galvanic cell-treated fluoroalkyl compound can further include treatment with a second electrolytic cell including the first electrolytic cathode, one or more second bipolar electrodes, and a second electrolytic anode, wherein the second bipolar electrodes are between the first electrolytic cathode and the second electrolytic anode. The destroying the galvanic cell-treated fluoroalkyl compound can further include treatment with a third electrolytic cell including the second electrolytic anode, one or more third bipolar electrodes, and a second electrolytic cathode.

The electrolytic anode, electrolytic cathode, and bipolar electrodes can be a first electrolytic anode, a first electrolytic cathode, and first bipolar electrodes, wherein the destroying the galvanic cell-treated fluoroalkyl compound can further include treatment with a second electrolytic cell including the first electrolytic anode, one or more second bipolar electrodes, and a second electrolytic cathode, wherein the second bipolar electrodes are between the first electrolytic anode and the second electrolytic cathode. The destroying the galvanic cell-treated fluoroalkyl compound can further include treatment with a third electrolytic cell including the second electrolytic cathode, one or more third bipolar electrodes, and a second electrolytic anode.

Figure 4:
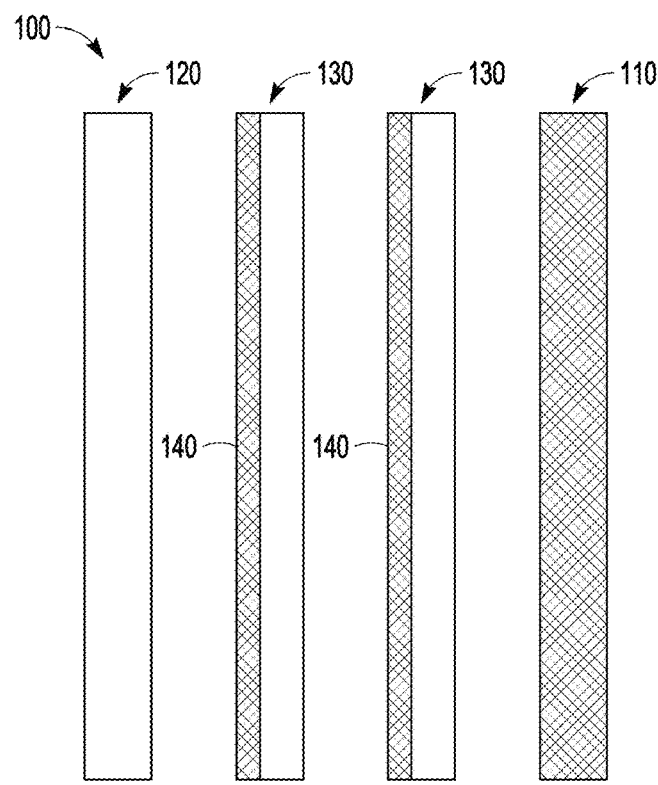
FIG. 4 illustrates an electrolytic cell, in accordance with various aspects of the present invention.

FIG. 4 illustrates an electrolytic cell 100 for destroying the galvanic cell-treated fluoroalkyl compound. The electrolytic cell includes an electrolytic anode plate 110. The electrolytic cell includes an electrolytic cathode plate 120. The electrolytic anode plate includes a catalyst coating. The electrolytic cell includes two bipolar plates 130 that are positioned between the electrolytic anode plate 110 and the electrolytic cathode plate 120. The two bipolar plates 130 each include a catalyst coating on one major face thereof 140 that is facing the electrolytic cathode plate 120.

Figure 5:
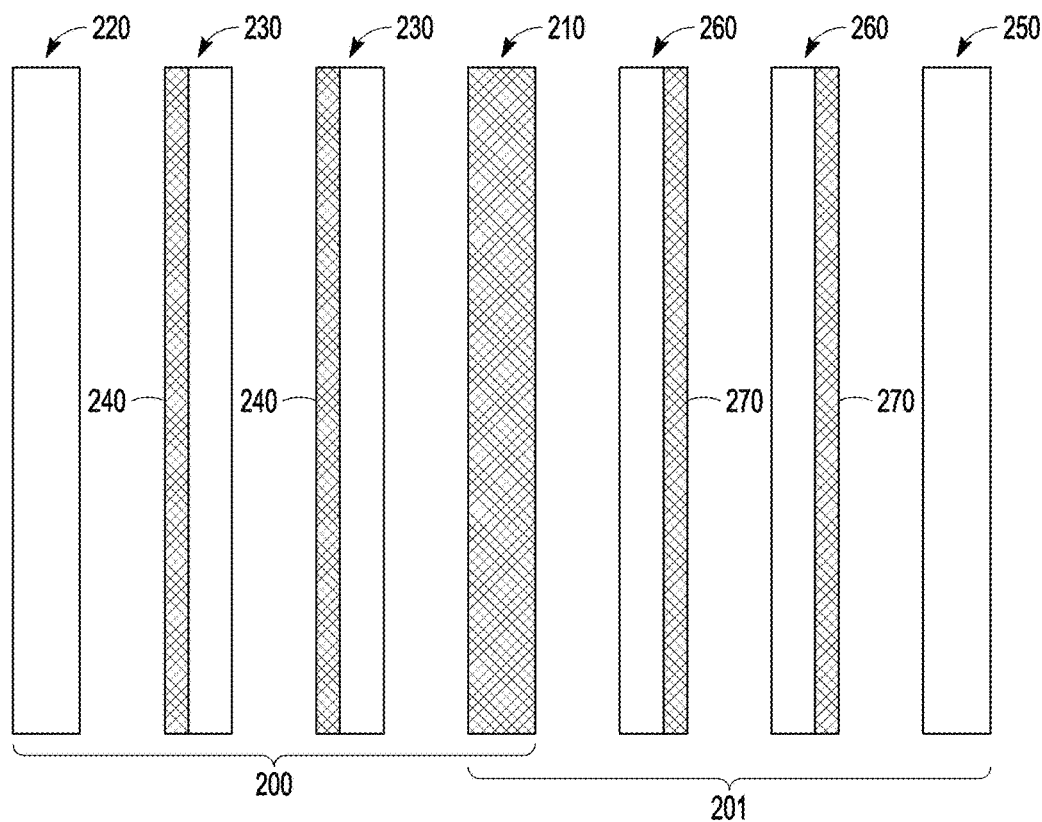
FIG. 5 illustrates two electrolytic cells, in accordance with various aspects of the present invention.

FIG. 5 illustrates two electrolytic cells include a first electrolytic cell 200 and a second electrolytic cell 201 for destroying the galvanic cell-treated fluoroalkyl compound. The first electrolytic cell 200 includes a first electrolytic cathode plate 220, a first electrolytic anode plate 210, and two first bipolar plates 230 positioned between the first electrolytic cathode plate 220 and the first electrolytic anode plate 210. The first electrolytic anode plate 210 includes a catalyst coating. The two first bipolar plates 230 includes a catalyst coating on one major face thereof 240 that is facing the first electrolytic cathode plate 220. The second electrolytic cell 201 includes the first electrolytic anode plate 210, a second electrolytic cathode plate 250, and two second bipolar plates 260. The two second bipolar plates 260 each include a catalyst coating on one major face thereof 270 that is facing the second electrolytic cathode plate 250.

Figure 6:
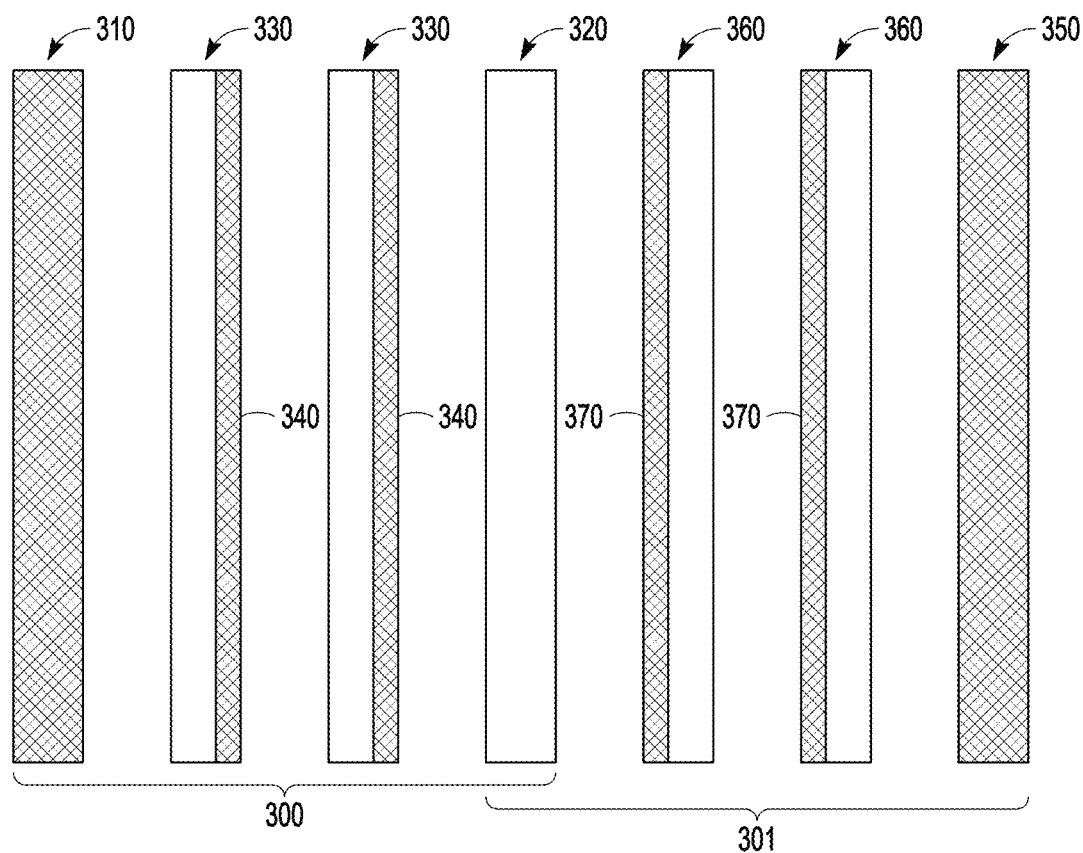
FIG. 6 illustrates two electrolytic cells, in accordance with various aspects of the present invention.

FIG. 6 illustrates two electrolytic cells including a first electrolytic cell 300 and a second electrolytic cell 301 for destroying the galvanic cell-treated fluoroalkyl compound. The first electrolytic cell 300 includes a first electrolytic anode plate 310, a first electrolytic cathode plate 320, and two first bipolar plates 330 positioned between the first anode plate 310 and the first electrolytic cathode plate 320. The first electrolytic anode plate 310 includes a catalyst coating. The two first bipolar plates 330 include a catalyst coating on one major face thereof 340 that is facing the first electrolytic cathode plate 320. The second electrolytic cell 301 includes the first electrolytic cathode plate 320, a second electrolytic anode plate 350, and two second bipolar plates 360. The second bipolar plates 360 are between the first electrolytic cathode plate 320 and the second electrolytic anode plate 350. The second electrolytic anode plate 350 includes a catalyst coating. The second bipolar plates 330 each include a catalyst coating on one major face thereof 370 that is facing the first electrolytic cathode plate 320.

Figure 7:
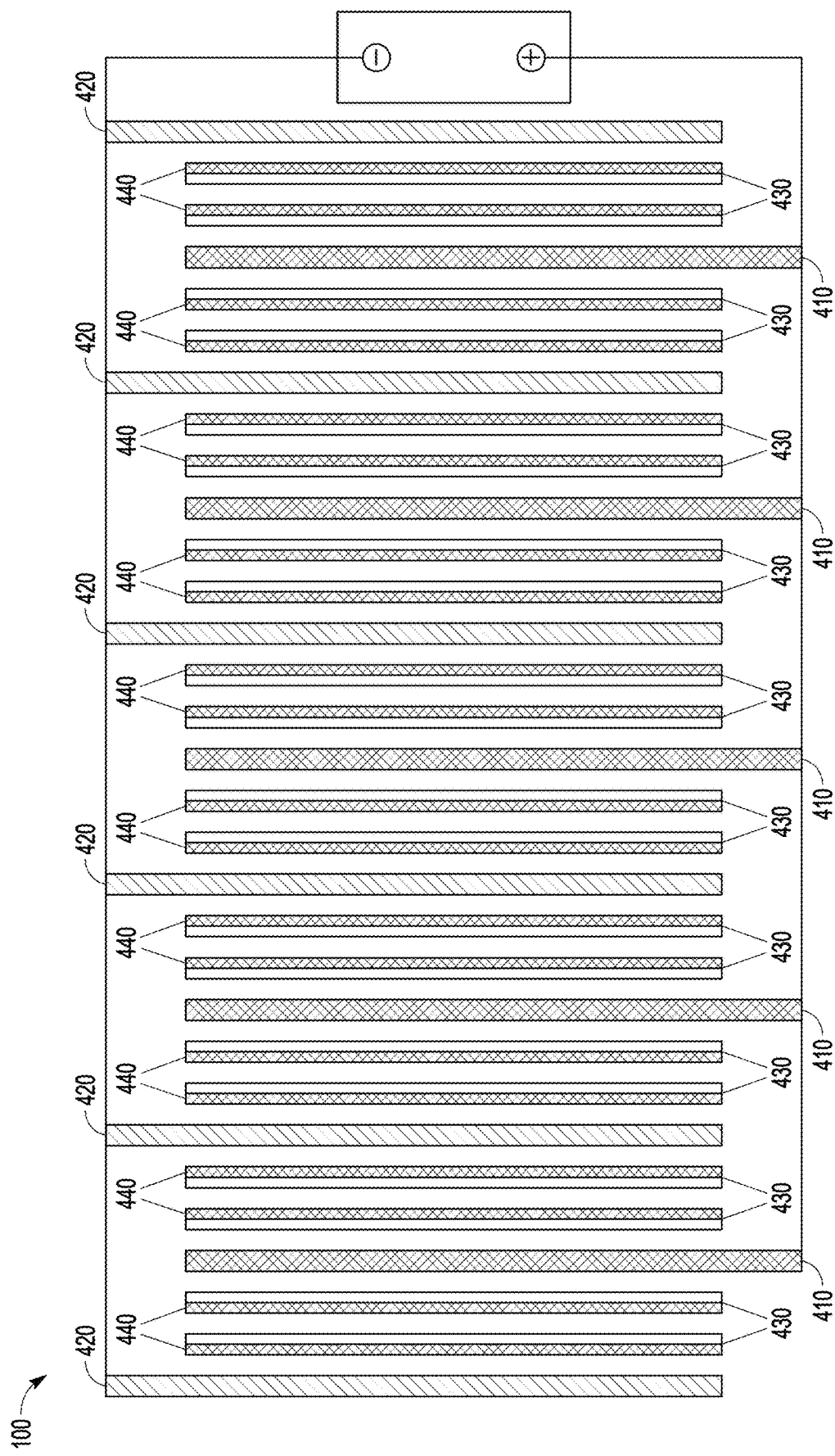
FIG. 7 illustrates a plurality of electrolytic cells, in accordance with various aspects of the present invention.

FIG. 7 illustrates a plurality of electrolytic cells 400 for destroying the galvanic cell-treated fluoroalkyl compound. Each electrolytic cell includes an electrolytic anode 410, an electrolytic cathode 420, and two bipolar plates 430. The electrolytic anode 410 includes a catalyst coating. The bipolar plates each include a catalyst coating on a major face thereof 440 that faces the nearest electrolytic cathode 420. FIG. 7 illustrates 10 electrolytic cells.

The galvanic cell-treated water including the galvanic cell-treated fluoroalkyl compound can include a foam that includes the galvanic cell-treated fluoroalkyl compound. The foam has a higher concentration of the galvanic cell-treated fluoroalkyl compound than a remainder of the galvanic cell-treated water (e.g., than non-foam portions of the galvanic cell-treated water). The foam can be generated during the treatment of the contaminated water with the galvanic cell. The foam can include bubbles formed on the anode and/or cathode, bubbles added to the solution with a bubbler (e.g., a device at or near a bottom of an apparatus that holds the galvanic cell that provides aeration using one or more suitable gases), or a combination thereof. The bubbles formed on the anode and/or cathode can include any suitable generated gas, such as hydrogen gas, oxygen gas, or a combination thereof. The bubbles added to the solution with a bubbler can include any suitable gas, such as air, an inert gas, nitrogen, hydrogen, a noble gas, helium argon, xenon, or a combination thereof. In various aspects, the method can be substantially free of vigorous stirring and/or mixing of the contaminated water that contacts the galvanic cell; the amount of foam can be increased or maximized by decreasing or minimizing the amount of agitation of the water being treated.

The separating of the galvanic cell-treated fluoroalkyl compound from the galvanic cell-treated water can include removing the foam from the galvanic cell-treated water, wherein the aqueous concentrate includes the foam. The removal of the foam can be conducted in any suitable manner. For example, the removing of the foam can include scraping the foam from the top of the galvanic cell-treated water, scooping the foam from the top of the galvanic cell-treated water, sucking the foam from the top of the galvanic cell-treated water, filtering the foam from the galvanic cell-treated water, decanting the foam from the galvanic cell-treated water, or a combination thereof. The removing of the foam can include scraping and/or scooping the foam from the top of the galvanic cell-treated water.

The method can further include breaking the foam, filtering the foam, or a combination thereof. Breaking the foam can include filtration, application of vacuum, application of heat, allowing the foam to sit for a suitable duration, or a combination thereof. Breaking the foam can form a broken foam, wherein a majority of bubbles of the foam have been broken. Filtering the foam can form a residue including the galvanic cell-treated fluoroalkyl compound. The residue has a higher concentration of the galvanic cell-treated fluoroalkyl compound than a filtrate formed during the filtering. Optionally, the filtrate formed during the filtering can be recycled back to previous steps of the method, such as to the contaminated water entering the galvanic cell for treatment, or such as for addition to the aqueous concentrate to form the aqueous composition.

The separating of the galvanic cell-treated fluoroalkyl compound from the galvanic cell-treated water can include adding a cationic polymer to the galvanic cell-treated water to form a complex including the galvanic cell-treated fluoroalkyl compound and the cationic polymer, and separating the complex from the galvanic cell-treated water to form the aqueous concentrate and the product water. The aqueous concentrate includes a higher concentration of the complex than the product water. The complex can include a salt formed via ionic bonding of the galvanic cell-treated fluoroalkyl compound and the cationic polymer. For example, for a galvanic cell including an aluminum anode (e.g., and having a copper cathode), the complex can include the cationic polymer and aluminum hydroxide particles (e.g., wherein the aluminum hydroxide includes Al from the anode) which have absorbed the galvanic cell-treated fluoroalkyl compound. The complex can be a solid in the galvanic cell-treated water. The complex can be a flocculant in the galvanic cell-treated water. The cationic polymer can be any suitable flocculating agent. The cationic polymer can be a natural polymer, a synthetic polymer, a cationic polysaccharide, a gum, alginic acid, cellulose, a cellulose derivative, dextran, glycogen, a polyelectrolyte, a polymer including a quaternary ammonium group, poly(diallyl dimethyl ammonium chloride) (polyDADMAC), or a combination thereof.

The separating of the complex from the galvanic cell-treated water can include settling the complex from the galvanic cell-treated water, filtering the complex from the galvanic cell-treated water, or a combination thereof. The separating of the complex from the galvanic cell-treated water can include placing the galvanic cell-treated water including the complex in a settling tank to allow the complex to settle to a bottom thereof for collection, and filtering the galvanic cell-treated water to form a residue including the complex, wherein the residue has a higher concentration of the galvanic cell-treated fluoroalkyl compound than a filtrate formed by the filtering.

The method can further include pretreating the contaminated water prior to and/or during the contacting the contaminated water with the galvanic cell. The pretreatment can include any suitable pretreatment, such as adjusting pH of the contaminated water, adding one or more additives to the contaminated water, filtering the contaminated water, allowing sediment to settle from the contaminated water, removing nitrogen from the contaminated water (e.g., via electrochemical treatment of the water, or via treatment with an oxidizer such as sodium hypochlorite, to remove nitrogen as ammonia), removing phosphorus from the contaminated water, treating the contaminated water with a pretreatment galvanic cell, or a combination thereof. The pretreatment can include adjusting pH of the contaminated water to 2 to 12, or 5 to 7, or 10 to 12. The pretreatment can include adding one or more additives to the contaminated water. The one or more additives can include a polymer flocculant, a radical precursor, hydrogen peroxide, a persulfate salt, an oxidizer, sodium hypochlorite, NaCl, $CaCl_2$), KCl, or a combination thereof. The one or more additives can include a radical precursor including HOOH, $O_3$, $S_2O_8^-$, $I^-$, $CO_3^{2-}$, $HCO_3^-$, $H_2PO_4^-$, $HPO_4^{2-}$, $PO_4^{3-}$, $HSO_5^-$, or a combination thereof. The oxidizer can include ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

The pretreatment can include adding a base to the contaminated water to bring a pH of the contaminated water to 8 to 12, or 9.5 to 11.5, or 10 to 11, or less than or equal to 12 and greater than or equal to 8 and less than, equal to, or greater than 8.5, 9, 9.5, 10, 10.5, 11, or 11.5. The pretreatment can further include filtering the contaminated water having base added thereto, wherein the filtered contaminated water can be subjected to contacting with the galvanic cell. The method can further include adding solids removed during filtration of the contaminated water having base added thereto to the aqueous concentrate.

In various aspects, the pretreatment further includes removing nitrogen from the contaminated water as ammonia. The nitrogen can be removed after adding the base to the contaminated water. Removing the nitrogen can include adding an oxidizer to the water. Any suitable oxidizer can be used, such as sodium hypochlorite. The method can further include filtering the contaminated water having nitrogen removed therefrom as ammonia, wherein the filtered contaminated water can be subject to contacting with the galvanic cell. The method can further include adding solids removed during filtration of the contaminated water having nitrogen removed therefrom as ammonia to the aqueous concentrate. In various aspects, the method is free of removal of nitrogen during the pretreatment.

The method can include adding a metal component including a metal (e.g., an ion of the metal, a dissolved or solid compound of the metal, an elemental form of the metal, or a combination thereof) to the contaminated water. The metal of the metal component can be the same as a metal in one or more electrodes of the galvanic cell. For example, the galvanic cell can include an aluminum anode, and the metal component added to the contaminated water can be an aluminum ion (e.g., $Al^{3+}$) and/or aluminum hydroxide. In other aspects, the metal of the metal component can be different than the metals in the electrodes of the galvanic cell. The metal component added to the contaminated water can be in the state of a dissolved metal ion, dissolved salt of the metal ion, a dissolved compound including the metal ion, a solid salt including the metal ion, a solid compound including the metal ion, or a combination thereof. A solid salt or a solid compound including the metal ion can be a precipitate formed after basification of electrolytically-treated aqueous concentrate.

In various aspects, the metal component added to the contaminated water is a recycled metal component including a metal formed from the one or more electrodes of the galvanic cell during a previous cycle of contacting of the galvanic cell and the contaminated water. For example, the method can include contacting contaminated water and a galvanic cell including an aluminum anode to form an aqueous concentrate that includes an aluminum component (e.g., aluminum ions, a solid or dissolved compound of aluminum such as aluminum hydroxide, elemental aluminum, or a combination thereof). After electrolytic treatment of the aqueous concentrate, the liquid portion of the electrolytically-treated aqueous concentrate including dissolved aluminum component can be added to contaminated water prior to or during contacting with the galvanic cell, thereby recycling the produced aluminum back into the process. The method can further includes storing recovered aluminum component for later addition to the contaminated water, or metering the addition of recovered aluminum component to the contaminated water. The method can include maintaining a desired concentration of the metal component in the contaminated water during the contacting with the galvanic cell. The metal component can be added to the contaminated water at any suitable point in the method, such as prior to any pretreatment, after all pretreatments but before contacting with the galvanic cell, after addition of base, after addition of base and removal of nitrogen as ammonia, during contacting with the galvanic cell, or a combination thereof.

Figure 8:
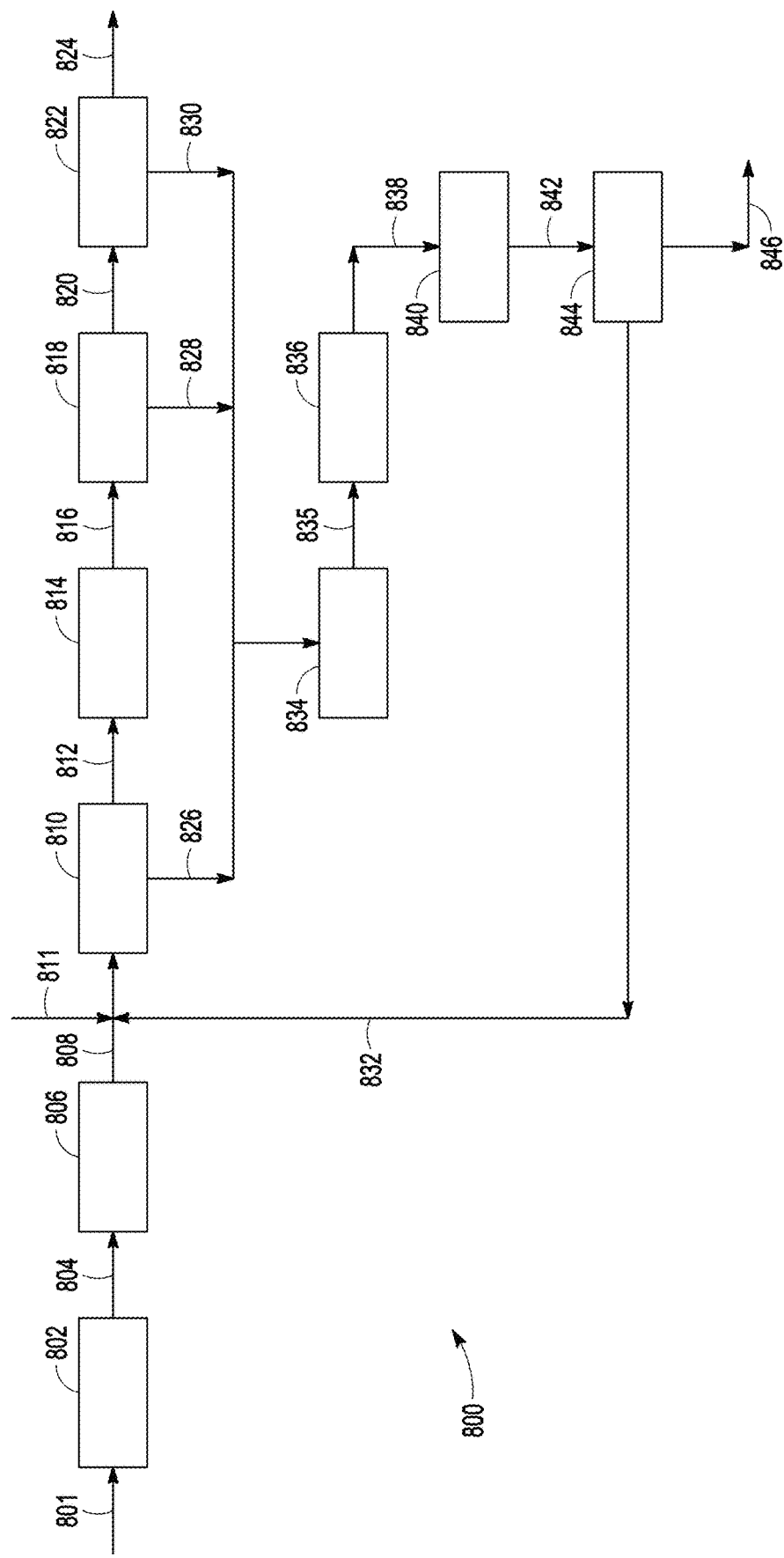
FIG. 8 illustrates a block flow diagram showing a method of treating contaminated water, in accordance with various aspects of the present invention.

FIG. 8 illustrates a block flow diagram showing a method of treating contaminated water 800. The method can include subjecting contaminated water 801 including a fluoroalkyl compound to a pretreatment including basification 802 (e.g., addition of NaOH to bring pH to about 10.5) to produce basified contaminated water 804. The method can include subjecting basified contaminated water 804 to nitrogen removal 806 (e.g., addition of sodium hypochlorite to remove nitrogen as ammonia) to produce contaminated water having nitrogen removed therefrom 808. The contaminated water having nitrogen removed therefrom 808 can optionally have metal component added thereto via stream 811 (e.g., dissolved metal ions that are the same as metal ions released by the anode such as aluminum ions, or a solid compound of aluminum such as aluminum hydroxide). The contaminated water having nitrogen removed therefrom 808 can be subjected to a separation process 810 to produce a liquid contaminated water 812 and solid contaminants 826. During or prior to separation process 810, a polymer can be added, such as a flocculating polymer. The liquid contaminated water 812 can be contacted with the galvanic cell 814 (e.g., a galvanic cell including an anode that includes aluminum and a cathode that includes copper) to produce galvanic cell-treated water 816 that includes a galvanic cell-treated fluoroalkyl compound. Prior to or during contacting with the galvanic cell, the method can include adding to the contaminated water HCl (e.g., to bring pH to about 5.5) and/or adding $H_2O_2$. The method can include separating 818 the galvanic cell-treated fluoroalkyl compound from the galvanic cell-treated water 816 to form product water 820 having a lower concentration of the fluoroalkyl compound than the contaminated water 801 (or 812) and to form an aqueous concentrate 828 having a higher concentration of the galvanic cell-treated fluoroalkyl compound than the product water. The method can include posttreatment of the product water 820 (e.g., filtration, such as ultrafiltration) to form posttreated product water 824 and solids 830. The solid contaminants 826 and solids 830 can be combined with aqueous concentrate 828. The aqueous concentrate can be subjected to conditioning 834 (e.g., addition of $H_2SO_4$ to bring pH to about 2) to form conditioned aqueous concentrate 835. The conditioned aqueous concentrate 835 can be subjected to contacting with an electrolytic cell 836 to destroy the galvanic cell-treated fluoroalkyl compound and to form electrolytically treated aqueous composition 838. The electrolytically treated aqueous composition 838 can be subjected to conditioning 840 (e.g., addition of NaOH or $Ca(OH)_2$ to bring to about 6.5-7 pH, and addition of flocculating polymer) to form conditioned electrolytically treated aqueous composition 842, which can be subjected to separation 844 (e.g., filtration) to form a liquid 832 and a solid 846. The solid contains the destroyed fluoroalkyl compound. The liquid 832, which can include the metal component including the metal produced from the galvanic cell such as aluminum ions or aluminum hydroxide, can be added to the contaminated water, such as prior to separation 810.

Figure 9:
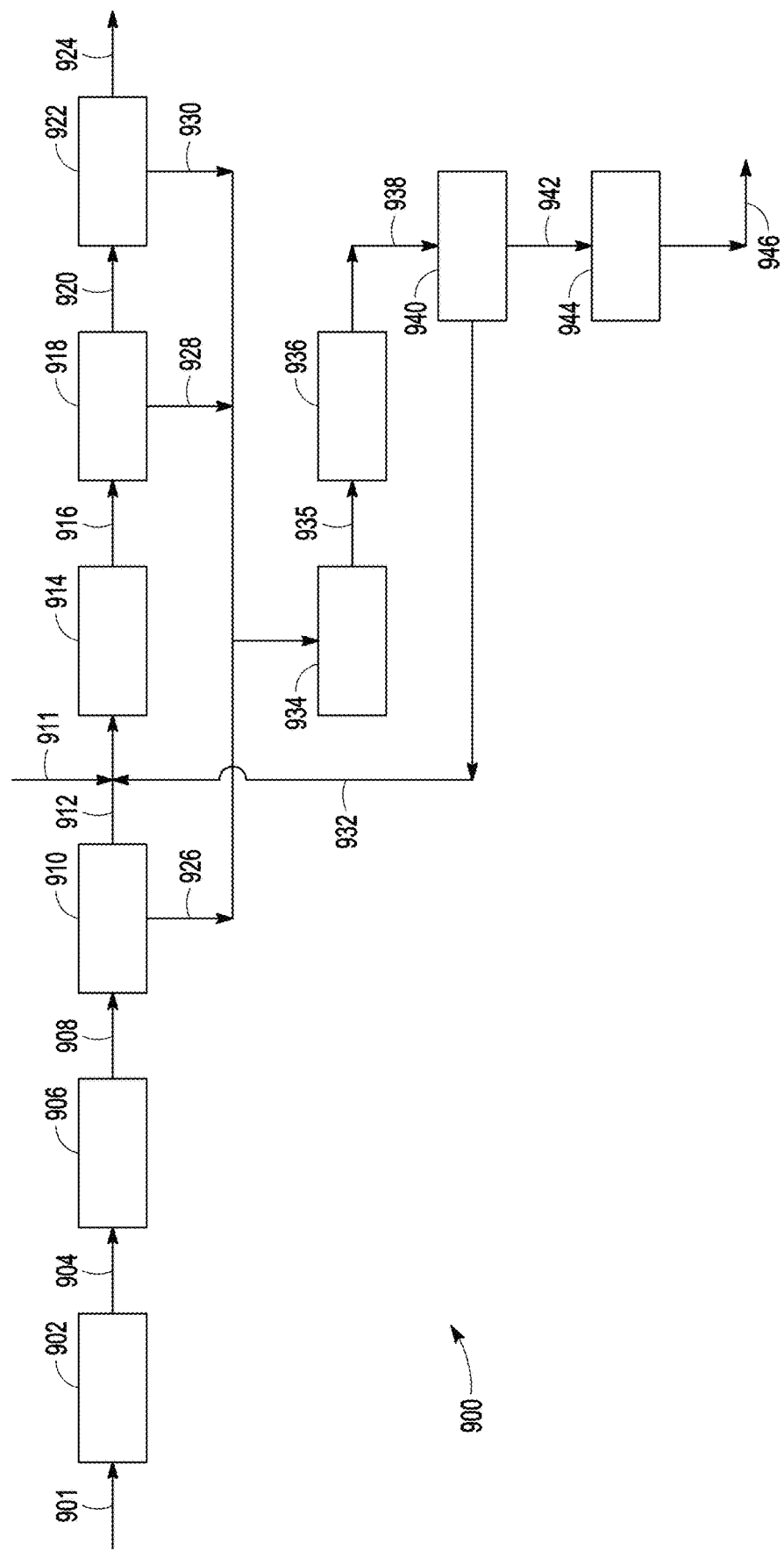
FIG. 9 illustrates a block flow diagram showing a method of treating contaminated water, in accordance with various aspects of the present invention.

FIG. 9 illustrates a block flow diagram showing a method of treating contaminated water 900. The method can include subjecting contaminated water 901 including a fluoroalkyl compound to a pretreatment including basification 902 (e.g., addition of NaOH to bring pH to about 10.5) to produce basified contaminated water 904. The method can include subjecting basified contaminated water 904 to nitrogen removal 906 (e.g., addition of sodium hypochlorite to remove nitrogen as ammonia) to produce contaminated water having nitrogen removed therefrom 908. The contaminated water having nitrogen removed therefrom 908 can optionally have metal component added thereto via stream 911 (e.g., dissolved metal ions that are the same as metal ions released by the anode such as aluminum ions, or a solid compound of the metal such as aluminum hydroxide). The contaminated water having nitrogen removed therefrom 908 can be subjected to a separation process 910 to produce a liquid contaminated water 912 and solid contaminants 926. During or prior to separation process 910, a polymer can be added, such as a flocculating polymer. The liquid contaminated water 912 can be contacted with the galvanic cell 914 (e.g., a galvanic cell including an anode that includes aluminum and a cathode that includes copper) to produce galvanic cell-treated water 916 that includes a galvanic cell-treated fluoroalkyl compound. Prior to or during contacting with the galvanic cell, the method can include adding to the contaminated water HCl (e.g., to bring pH to about 5.5) and/or adding $H_2O_2$. The method can include separating 918 the galvanic cell-treated fluoroalkyl compound from the galvanic cell-treated water 916 to form product water 920 having a lower concentration of the fluoroalkyl compound than the contaminated water 901 (or 912) and to form an aqueous concentrate 928 having a higher concentration of the galvanic cell-treated fluoroalkyl compound than the product water. The method can include posttreatment of the product water 920 (e.g., filtration, such as ultrafiltration) to form posttreated product water 924 and solids 930. The solid contaminants 926 and solids 930 can be combined with aqueous concentrate 928. The aqueous concentrate can be subjected to conditioning 934 (e.g., addition of $H_2SO_4$ to bring pH to about 2) to form conditioned aqueous concentrate 935. The conditioned aqueous concentrate 935 can be subjected to contacting with an electrolytic cell 936 to destroy the galvanic cell-treated fluoroalkyl compound and to form electrolytically treated aqueous composition 938. The electrolytically treated aqueous composition 938 can be subjected to separation 940 (e.g., filtration) to form a liquid 932 and a solid 942. The liquid 932, which can include the metal component including the metal produced by the galvanic cell such as aluminum ions or aluminum hydroxide, can be added to the contaminated water, such as after separation 910 and prior to contacting with the galvanic cell 912. The solid can be subjected to conditioning 944 (e.g., addition of NaOH or $Ca(OH)_2$ to bring to about 6.5-7 pH) to form solid 946, which contains the destroyed fluoroalkyl compound.

During contacting with the galvanic cell, the contaminated water can have any suitable concentration of the metal component. For example, the galvanic cell can be a galvanic cell including an anode that includes aluminum and including a cathode that includes copper, and the concentration of aluminum ions in the contaminated water (e.g., as a result of both the generation of aluminum ions by the galvanic cell and as a result of addition of the metal component to the contaminated water), can be 1 mg/L to 2000 mg/L, or 50 mg/L to 1000 mg/L, or less than or equal to 2000 mg/L and greater than or equal to 1 mg/L and less than, equal to, or greater than 2, 4, 6, 8, 10, 15, 20, 25, 30, 40, 50, 75, 100, 150, 200, 250, 300, 350, 400, 450, 500, 600, 700, 800, 900, 1000, 1250, 1500, or 1750 mg/L. The state of the metal component in the contaminated water contacted with the galvanic cell can be a dissolved metal ion, dissolved salt of the metal ion, a dissolved compound including the metal ion, a solid salt including the metal ion, a solid compound including the metal ion, or a combination thereof. The state of the metal ion can be a solid in the form of aluminum hydroxide particles.

The galvanic cell can produce any suitable concentration of the metal component in the contaminated water during contacting therewith (e.g., not as a result of separately adding a metal component to the contaminated water), such as a concentration of 1 mg/L to 2000 mg/L, or 50 mg/L to 1000 mg/L, or less than or equal to 2000 mg/L and greater than or equal to 1 mg/L and less than, equal to, or greater than 2, 4, 6, 8, 10, 15, 20, 25, 30, 40, 50, 75, 100, 150, 200, 250, 300, 350, 400, 450, 500, 600, 700, 800, 900, 1000, 1250, 1500, or 1750 mg/L. Any metal component added or recycled to the contaminated water can increase the concentration of metal component in the contaminated water by 1 mg/L to 2000 mg/L, or 50 mg/L to 1000 mg/L, or less than or equal to 2000 mg/L and greater than or equal to 1 mg/L and less than, equal to, or greater than 2, 4, 6, 8, 10, 15, 20, 25, 30, 40, 50, 75, 100, 150, 200, 250, 300, 350, 400, 450, 500, 600, 700, 800, 900, 1000, 1250, 1500, or 1750 mg/L.

During the method, a proportion in the contaminated water being contacted with the galvanic cell of the metal component added or recycled to the metal component generated during the current cycle of contacting the contaminated water with the galvanic cell can be 0:100 (e.g., no metal component is added or recycled), or 1:100 to 100:1, or can be less than or equal 100:1 and greater than or equal to 1:100 and less than, equal to, or greater than 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1.

In FIG. 8, a large amount of aluminum is lost due to basification and flocculation of the electrolytically treated aqueous composition prior to removal of the liquid therefrom. The lost aluminum represents a substantial cost of operation both in terms of the cost of aluminum as well as additional disposal costs. In FIG. 9, a substantially lower amount of aluminum is lost, due to recycling of the liquid phase of the electrolytically treated aqueous composition prior to basification thereof.

The method can include acidifying the aqueous concentrate. In embodiments including destruction of the galvanic cell-treated fluoroalkyl compound in the aqueous concentrate, the acidifying can be performed prior to the destruction. The method can further includes performing a secondary separation to separate a residual solution from the aqueous concentrate after the acidifying and prior to any destruction of the galvanic cell-treated fluoroalkyl compound to concentrate the galvanic cell-treated fluoroalkyl compound in the aqueous concentrate and to form the residual solution separated therefrom. The separation can be any suitable separation technique, such as filtration, precipitation, extraction, aeration, decantation, or a combination thereof. In various aspects, the secondary separation can include aerating the aqueous concentrate to form a foam therein, which can rise to the top of the residual solution. The secondary separation can include separating the residual solution from the foam.

The secondary separation can further concentrate the galvanic cell-treated fluoroalkyl compound. For example, a ratio of a volume of the aqueous concentrate having the residual solution removed therefrom to a volume of the acidified aqueous concentrate prior to removal of the residual solution therefrom can be 1:100,000 to 1:1, 1:10,000 to 1:5, or less than or equal to 1:1 and greater than or equal to 1:100,000 and less than, equal to, or greater than 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:60, 1:70, 1:80, 1:90, 1:100, 1:150, 1:200, 1:250, 1:500, 1:1,000, 1:1,500, 1:2,000, 1:2,500, 1:5,000, 1:10,000, 1:15,000, 1:20,000, 1:25,000, 1:50,000, or 1:75,000. A ratio of a volume of the aqueous concentrate having the residual solution removed therefrom to a volume of the contaminated water can be 1:1,000,000 to 1:1, or 1:100,000 to 1:10, or less than or equal to 1:1 and greater than or equal to 1:1,000,000 and less than, equal to, or greater than 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:60, 1:70, 1:80, 1:90, 1:100, 1:150, 1:200, 1:250, 1:500, 1:1,000, 1:1,500, 1:2,000, 1:2,500, 1:5,000, 1:10,000, 1:15,000, 1:20,000, 1:25,000, 1:50,000, 1:75,000, 1:100,000, 1:150,000, 1:200,000, 1:250,000, 1:500,000, or 1:750,000.

In various aspects, removal of fluoroalkyl compounds from water can be conducted as a series of stages, including treatment of the contaminated water with the galvanic cell which can collect the fluoroalkyl compound on the surface of particles such as aluminum hydroxide particles. The particles can then be separated (e.g., via sedimentation) to form an aqueous concentrate that contains a majority of the fluoroalkyl compounds (e.g., 90% or more). The aqueous concentrate can then be dewatered (e.g., in a mechanical press or similar device). Next, the dewatered solids can be dissolved at low pH (e.g., pH of 2-3) by adding an acid such as HCl and/or $H_2SO_4$ and to form an acidified solution having a high concentration of the metal component from the galvanic cell such as aluminum ions and/or aluminum hydroxide. In the acidified solution, the fluoroalkyl compounds can be dissociated in the aqueous phase with the acid (neutral species) in equilibrium with their conjugate base (ionic species) ($C_nF_mCOOH<>C_nFMCOO^-+H^+$). The relationship between the concentrations of the two fluoroalkyl compound species (acid vs. conjugate base) is determined by the pH value. The equilibrium can be driven toward the acid species at low pH (e.g., pH of 2-3). The acid species (neutral species) can have significantly enhanced hydrophobicity which can favor increased concentration of the acid species at the water-air interface.

Under these conditions, the acid species of the fluoroalkyl compound can move easily with the addition of air or gas bubbles to the interfacial region so as to create a froth layer containing a majority (e.g., approximately 99.99% or more) of the molecules of the fluoroalkyl compound. Removal of the froth from the residual solution can result in a preferential concentration (e.g., into $\frac{1}{10}^{th}$ its original volume), allowing destruction of the fluoroalkyl compound (e.g., via an electrochemical process, or other process) can become more efficient and economically viable. The residual solution having low pH (e.g., pH of 2-3), can have a high concentration of metal component from the galvanic cell (e.g., aluminum ions and/or aluminum hydroxide) that can be recovered, reused and recycled back for reuse in the method by adding the residual solution to the contaminated water.

In various aspects, all or a portion of the residual solution can be recycled for reuse of the metal of the metal component. For any non-recycled portions, if there are no environmental limitations on the concentration of metal component that can be reintroduced, the water enriched with the metal component (e.g., aluminum ions and/or aluminum hydroxide) can be dosed into the product water. For environmental considerations the pH can be increased with a base (e.g., sodium hydroxide, such as to pH of 3.5-4) to precipitate solid aluminum particles. At increased pH (e.g., 3.5-4), the metal component can exist in the form of polymers (e.g., aluminum-containing polymers) having high adsorption capacity and a composition similar to particles formed by the treatment of the contaminated water in the galvanic cell.

The residual solution includes the metal component including the metal produced by the galvanic cell, such as an aluminum ion and/or aluminum hydroxide. The method can further include recycling the metal of the metal component including combining the contaminated water and the residual solution prior to and/or during contacting the contaminated water and the galvanic cell. In various aspects, the recycling the metal of the metal component can further include purging one or more acidification contaminants from the residual solution prior to combining the contaminated water and the residual solution. In embodiments that include destruction of the galvanic cell-treated fluoroalkyl compound, the destroying the galvanic cell-treated fluoroalkyl compound in the aqueous concentrate can form a liquid including the metal component, and the method can further include recycling the metal component including combining the contaminated water and the liquid including the metal component prior to and/or during the contacting of the contaminated water and the galvanic cell. The recycling can further include purging one or more acidification contaminants from the liquid including the metal component prior to combining the contaminated water and the liquid including the metal component. In various aspects, the residual solution and the liquid including the metal component can be combined to form a recycle stream that is subjected to the purging of acidification contaminants.

The purging can include removing one or more contaminant ions from the liquid including the metal component, wherein the one or more contaminant ions are from the acidification. The purging can include removing sulfate, chloride, or a combination thereof, from the liquid including the metal component. The purging can reduce or eliminate build-up of contaminants added to the recycle loop via the acidification step, such as sulfate from sulfuric acid or chloride from hydrochloric acid.

The purging can include raising a pH of the liquid including the metal component to 3 or less (e.g., 1 to 3, or 2 to 3, or less than or equal to 3 and greater than or equal to 1 and less than, equal to, or greater than 1.1, 1.2, 1.3, 1.4, 1.5, 1.6, 1.7, 1.8, 1.9, 2, 2.1, 2.2, 2.3, 2.4, 2.5, 2.6, 2.7, 2.8, or 2.9) and filtering out a salt of the one or more contaminant ions from the liquid including the metal component. The purging can include raising a pH of the liquid including the metal component to 3 or less and filtering solid aluminum sulfate from the liquid including the metal component. The purging can include raising a pH of the liquid including the metal component to 4 or less (e.g., 3.5 or less, or 1 to 4, or 1 to 3.5, or less than or equal to 3 and greater than or equal to 1 and less than, equal to, or greater than 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, or 3.9), filtering a solid salt of the metal component from a residual liquid, and combining the solid salt of the metal component with the contaminated water or dissolving the solid salt in water prior to adding to the contaminated water. The purging can include raising a pH of the liquid including the metal component to 4 or less, or 3.5 or less, filtering aluminum chloride from the liquid including the metal component, and combining the solid salt of the metal component with the contaminated water or dissolving the solid salt in water prior to adding to the contaminated water. The purging can occur continuously or periodically, which can be determined based on a concentration measurement of the contaminant in the recycle stream.

In the case of excess sulfate, the recycle stream (which can include the liquid including the metal or and/or the residual liquid) can be partially neutralized with a base (e.g., calcium hydroxide) to a pH of approximately but not exceeding 3, which can cause the sulfate to precipitate as calcium sulfate which can then be filtered and removed from the system. In the case of excess chloride, the pH of the recycle stream can be elevated using sodium hydroxide to a pH not exceeding 3.5 to 4. In this case, the metal ion itself (e.g., Al) precipitates and can be filtered and returned to the system. The pH 3.5-4 liquid can be blended with the product water at a suitable rate.

Figure 10:
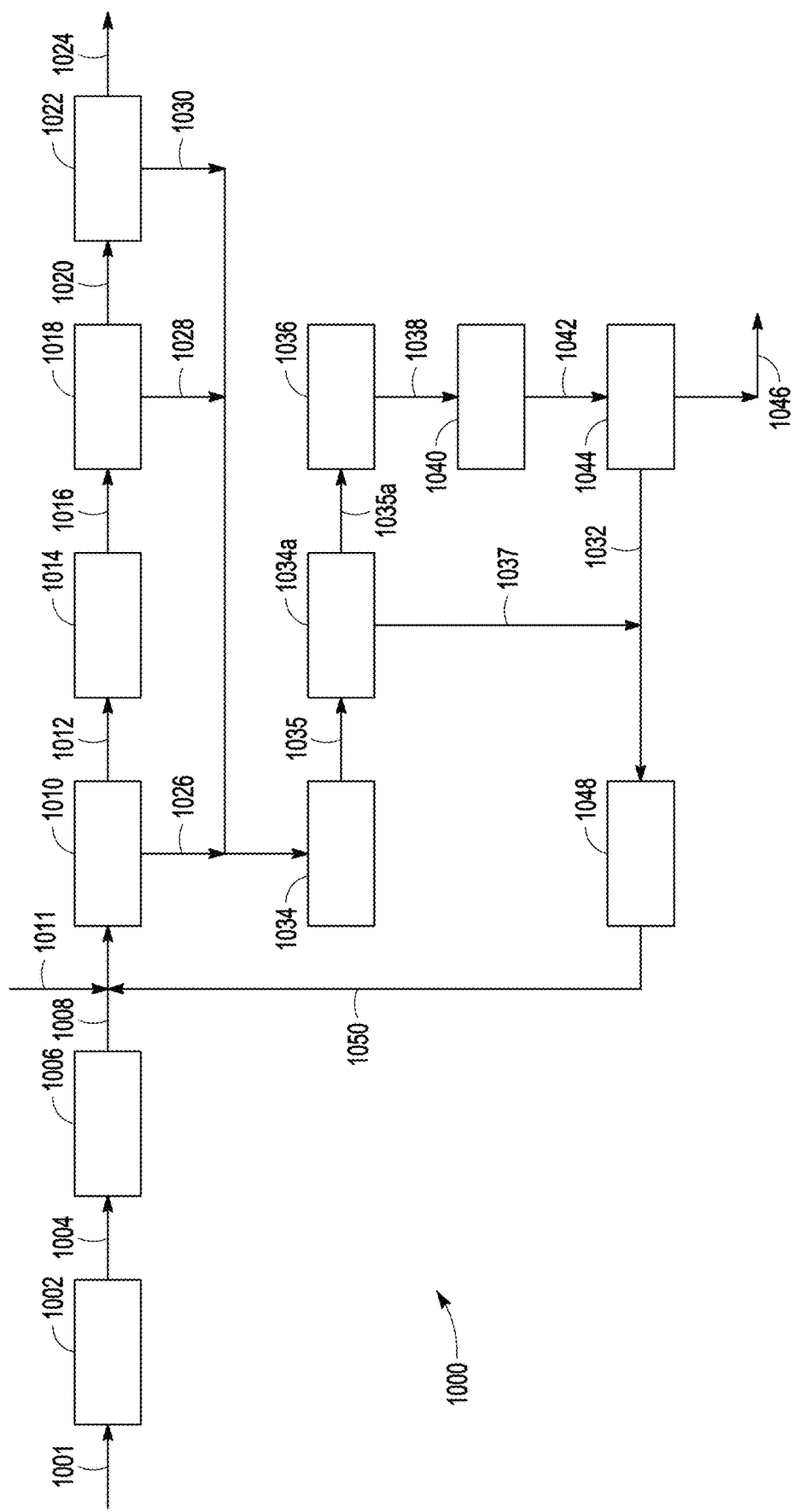
FIG. 10 illustrates a block flow diagram showing a method of treating contaminated water, in accordance with various aspects of the present invention.

FIG. 10 illustrates a block flow diagram showing a method of treating contaminated water 1000. The method can include subjecting contaminated water 1001 including a fluoroalkyl compound to a pretreatment including basification 1002 (e.g., addition of NaOH to bring pH to about 10.5) to produce basified contaminated water 1004. The method can include subjecting basified contaminated water 1004 to nitrogen removal 1006 (e.g., addition of sodium hypochlorite to remove nitrogen as ammonia) to produce contaminated water having nitrogen removed therefrom 1008. The contaminated water having nitrogen removed therefrom 1008 can optionally have a metal component added thereto via stream 1011 (e.g., dissolved metal ions that are the same as metal ions released by the anode such as aluminum ions, or a solid compound of the metal ion such as aluminum hydroxide). The contaminated water having nitrogen removed therefrom 1008 can be subjected to a separation process 1010 to produce a liquid contaminated water 1012 and solid contaminants 1026. During or prior to separation process 1010, a polymer can be added, such as a flocculating polymer. The liquid contaminated water 1012 can be contacted with the galvanic cell 1014 (e.g., a galvanic cell including an anode that includes aluminum and a cathode that includes copper) to produce galvanic cell-treated water 1016 that includes a galvanic cell-treated fluoroalkyl compound. Prior to or during contacting with the galvanic cell, the method can include adding to the contaminated water HCl (e.g., to bring pH to about 5.5) and/or adding $H_2O_2$. The method can include separating 1018 the galvanic cell-treated fluoroalkyl compound from the galvanic cell-treated water 1016 to form product water 1020 having a lower concentration of the fluoroalkyl compound than the contaminated water 1001 (or 1012) and to form an aqueous concentrate 1028 having a higher concentration of the galvanic cell-treated fluoroalkyl compound than the product water. The method can include posttreatment of the product water 1020 (e.g., filtration, such as ultrafiltration) to form posttreated product water 1024 and solids 1030. The solid contaminants 1026 and solids 1030 can be combined with aqueous concentrate 1028. The aqueous concentrate can be subjected to conditioning 1034 (e.g., addition of $H_2SO_4$ to bring pH to about 2) to form conditioned aqueous concentrate 1035. The conditioned aqueous concentrate 1035 can be subjected to a secondary separation 1034a (e.g., acration/foaming) to remove a residual liquid 1037 therefrom, and to form the aqueous concentrate having residual liquid removed therefrom 1035a. The residual liquid 1037 can include the metal component including the metal generated by the galvanic cell, such as aluminum ions and/or aluminum hydroxide. The residual liquid can be combined with liquid stream 1032 for recycling of the metal component back to the contaminated water. The aqueous concentrate having the residual liquid removed therefrom 1035a can be subjected to contacting with an electrolytic cell 1036 to destroy the galvanic cell-treated fluoroalkyl compound and to form electrolytically treated aqueous composition 1038. The electrolytically treated aqueous composition 1038 can be subjected to conditioning 1040 (e.g., addition of NaOH or $Ca(OH)_2$ to bring to about 6.5-7 pH, and addition of flocculating polymer) to form conditioned electrolytically treated aqueous composition 1042, which can be subjected to separation 1044 (e.g., filtration) to form a liquid 1032 and a solid 1046. The solid contains the destroyed fluoroalkyl compound. The liquid 1032, which can include the metal component including a metal produced by the galvanic cell such as aluminum ions or aluminum hydroxide, can be subjected to purging 1048 to remove one or more acidification contaminants from the water (e.g., sulfate and/or chloride). The purged liquid 1050 can be added to the contaminated water, such as prior to separation 1010.

Figure 11:
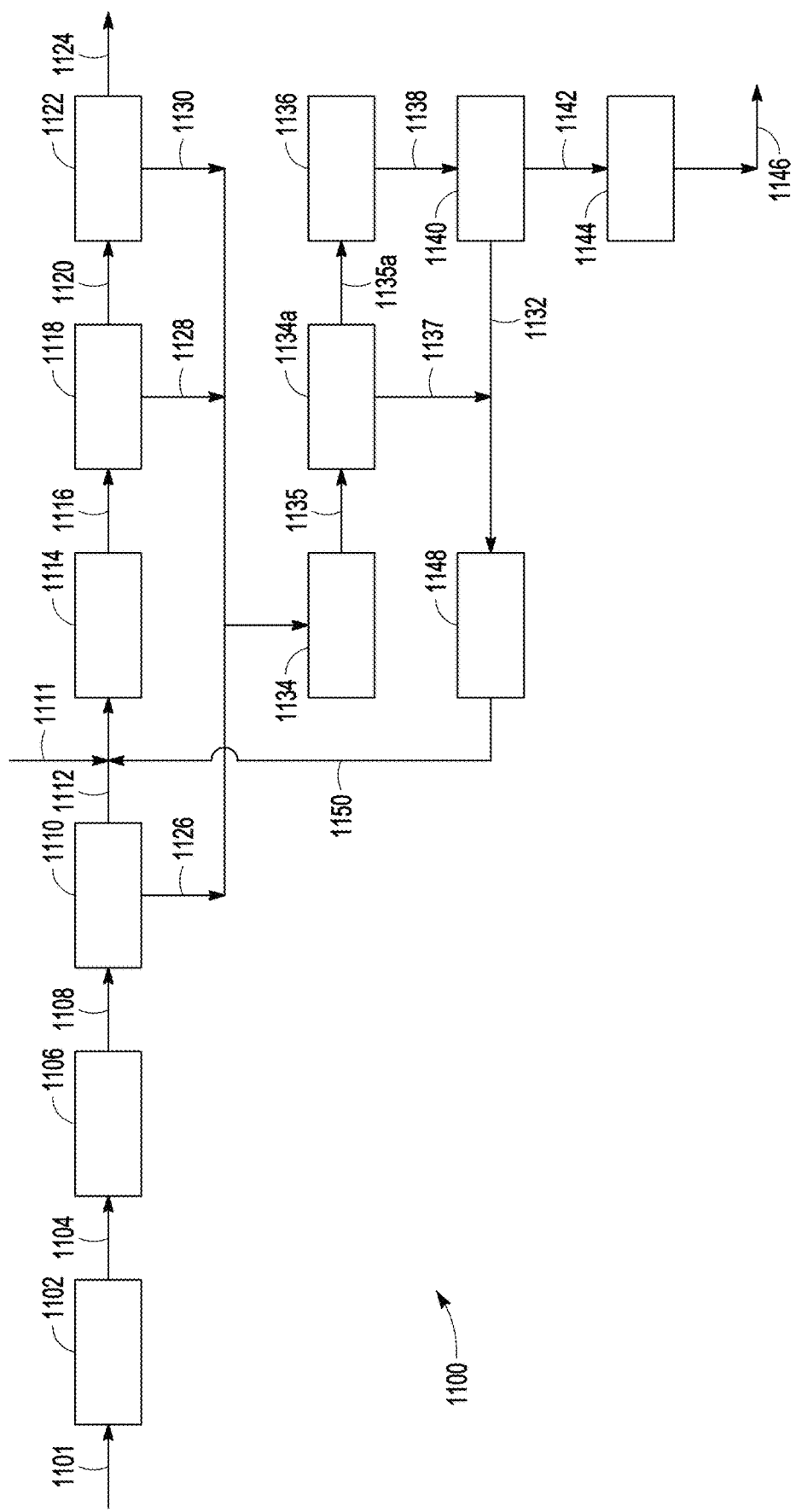
FIG. 11 illustrates a block flow diagram showing a method of treating contaminated water, in accordance with various aspects of the present invention.

FIG. 11 illustrates a block flow diagram showing a method of treating contaminated water 1100. The method can include subjecting contaminated water 1101 including a fluoroalkyl compound to a pretreatment including basification 1102 (e.g., addition of NaOH to bring pH to about 10.5) to produce basified contaminated water 1104. The method can include subjecting basified contaminated water 1104 to nitrogen removal 1106 (e.g., addition of sodium hypochlorite to remove nitrogen as ammonia) to produce contaminated water having nitrogen removed therefrom 1108. The contaminated water having nitrogen removed therefrom 908 can optionally have a metal component added thereto via stream 1111 (e.g., dissolved metal ions that are the same as metal ions released by the anode such as aluminum ions, or a solid compound of the metal such as aluminum hydroxide). The contaminated water having nitrogen removed therefrom 1108 can be subjected to a separation process 1110 to produce a liquid contaminated water 1112 and solid contaminants 1126. During or prior to separation process 1110, a polymer can be added, such as a flocculating polymer. The liquid contaminated water 1112 can be contacted with the galvanic cell 1114 (e.g., a galvanic cell including an anode that includes aluminum and a cathode that includes copper) to produce galvanic cell-treated water 1116 that includes a galvanic cell-treated fluoroalkyl compound. Prior to or during contacting with the galvanic cell, the method can include adding to the contaminated water HCl (e.g., to bring pH to about 5.5) and/or adding $H_2O_2$. The method can include separating 1118 the galvanic cell-treated fluoroalkyl compound from the galvanic cell-treated water 1116 to form product water 1120 having a lower concentration of the fluoroalkyl compound than the contaminated water 1101 (or 1112) and to form an aqueous concentrate 1128 having a higher concentration of the galvanic cell-treated fluoroalkyl compound than the product water. The method can include posttreatment of the product water 1120 (e.g., filtration, such as ultrafiltration) to form posttreated product water 1124 and solids 1130. The solid contaminants 1126 and solids 1130 can be combined with aqueous concentrate 1128. The aqueous concentrate can be subjected to conditioning 1134 (e.g., addition of $H_2SO_4$ to bring pH to about 2) to form conditioned aqueous concentrate 1135. The conditioned aqueous concentrate 1135 can be subjected to a secondary separation 1134a (e.g., acration/foaming) to remove a residual liquid 1137 therefrom, and to form the aqueous concentrate having residual liquid removed therefrom 1135a. The residual liquid 1137 can include a metal component including a metal generated by the galvanic cell, such as aluminum ions and/or aluminum hydroxide. The residual liquid can be combined with liquid stream 1132 for recycling of the metal of the metal component back to the contaminated water. The aqueous concentrate having the residual liquid removed therefrom 1135a can be subjected to contacting with an electrolytic cell 1136 to destroy the galvanic cell-treated fluoroalkyl compound and to form electrolytically treated aqueous composition 1138. The electrolytically treated aqueous composition 1138 can be subjected to separation 1140 (e.g., filtration) to form a liquid 1132 and a solid 1142. The liquid 1132, which can include the metal component including the metal produced by the galvanic cell such as aluminum ions or aluminum hydroxide, can be subjected to purging 1148 to remove one or more acidification contaminants from the water (e.g., sulfate and/or chloride). The purged liquid 1150, which can include a metal component including a metal produced by the galvanic cell such as aluminum ions and/or aluminum hydroxide, can be added to the contaminated water, such as after separation 1110 and prior to contacting with the galvanic cell 1112. The solid can be subjected to conditioning 1144 (e.g., addition of NaOH or $Ca(OH)_2$ to bring to about 6.5-7 pH) to form solid 1146, which contains the destroyed fluoroalkyl compound.

In FIG. 10, some aluminum is lost due to basification and flocculation of the electrolytically treated aqueous composition prior to removal of the liquid therefrom. However, due to the secondary separation, less aluminum is lost than in the method shown in FIG. 8. The lost aluminum represents a significant cost of operation both in terms of the cost of aluminum as well as additional disposal costs. In FIG. 11, a substantially lower amount of aluminum is lost, due to recycling of the liquid phase of the electrolytically treated aqueous composition prior to basification thereof.

In addition to the one or more fluoroalkyl compounds that are removed by the method, the contaminated water can further include one or more non-fluoroalkyl compounds. The contacting of the contaminated water with the galvanic cell can form a precipitate in the galvanic cell-treated water, wherein the precipitate includes the one or more non-fluoroalkyl compounds and/or reaction products thereof. The method can further include removing the precipitate from the galvanic cell-treated water such that the product water has a lower concentration of the non-fluoroalkyl compound than the contaminated water. For example, the one or more non-fluoroalkyl compounds can include phosphorus, wherein the contacting of the contaminated water with the galvanic cell forms a precipitate in the galvanic cell-treated water, the precipitate including the phosphorus from the contaminated water, wherein the method further includes removing the precipitate from the galvanic cell-treated water such that the product water has a lower concentration of phosphorus than the contaminated water.

In addition to the one or more fluoroalkyl compounds that are removed by the method, the contacting of the contaminated water with the galvanic cell can eliminate or reduce an emulsion in the contaminated water, can coagulate and/or precipitate suspended solids from the contaminated water, can remove or decrease the concentration of one or more organic compounds in the contaminated water, can remove or decrease the concentration of one or more inorganic compounds in the contaminated water, can remove or decrease the concentration of one or more dyes and/or inks in the contaminated water, can remove or decrease the concentration of one or more metals in the contaminated water, can remove or decrease the concentration of one or more heavy metals in the contaminated water, can remove or decrease the concentration of one or more toxic compounds and/or materials in the contaminated water, can remove or decrease the concentration of fluoride in the contaminated water, can remove or decrease the concentration of sulfide in the contaminated water, can remove or decrease the concentration of arsenic in the contaminated water, can reduce the chemical oxygen demand (COD) of the contaminated water, can remove or decrease the concentration of silica in the contaminated water, can reduce the turbidity of the contaminated water, or a combination thereof.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

EXEMPLARY ASPECTS

The following exemplary aspects are provided, the numbering of which is not to be construed as designating levels of importance:

Aspect 1 provides a method of treating contaminated water, the method comprising:
 contacting the contaminated water comprising a fluoroalkyl compound with a galvanic cell to form galvanic cell-treated water comprising a galvanic cell-treated fluoroalkyl compound; and
 separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Aspect 2 provides the method of Aspect 1, wherein the fluoroalkyl compound is a perfluoroalkyl or polyfluoroalkyl substance (PFAS), perfluoroalkyl substance, a polyfluoroalkyl substance, a perfluoroalkyl acid (PFAA), or a combination thereof.

Aspect 3 provides the method of any one of Aspects 1-2, wherein the fluoroalkyl compound is perfluorooctanesulfonic acid (PFOA), perfluorooctyl sulfonate (PFOS), perfluorohexanesulfonic acid (PFHxS), perfluorononanoic acid (PFNA), perfluorobutanesulfonic acid (PFBS), 2-(N-methyl-perfluorooctane sulfonamido) acetic acid, perfluoroheptanoic acid (PFHpA), n-perfluorooctane sulfonic acid, perfluoromethylheptane sulfonic acid, n-perfluorooctanoic acid, a branched perfluorooctanoic acid, perfluorodecanoic acid, perfluoroundecanoic acid, perfluorododecanoic acid, or a combination thereof.

Aspect 4 provides the method of any one of Aspects 1-3, wherein the galvanic cell-treated fluoroalkyl compound comprises an oxidation product of the fluoroalkyl compound, a complex formed between the fluoroalkyl compound and one or more ions formed by the galvanic cell, a reaction product of the fluoroalkyl compound and one or more ions formed by the galvanic cell, or a combination thereof.

Aspect 5 provides the method of any one of Aspects 1-4, wherein the contaminated water has a concentration of the fluoroalkyl compound of 1 part per trillion (ppt) to 100 parts per million (ppm).

Aspect 6 provides the method of any one of Aspects 1-5, wherein the contaminated water has a concentration of the fluoroalkyl compound of 20 part per trillion (ppt) to 1 part per million (ppm).

Aspect 7 provides the method of any one of Aspects 1-6, wherein the product water has a concentration of the fluoroalkyl compound and/or the galvanic cell-treated fluoroalkyl compound of less than 100 parts per trillion (ppt).

Aspect 8 provides the method of any one of Aspects 1-7, wherein the product water has a concentration of the fluoroalkyl compound and/or the galvanic cell-treated fluoroalkyl compound of 0.001 parts per trillion (ppt) to 4 parts per trillion (ppt).

Aspect 9 provides the method of any one of Aspects 1-8, wherein the product water has a concentration of the fluoroalkyl compound and/or the galvanic cell-treated fluoroalkyl compound that is 0% to 20% of the concentration of the fluoroalkyl compound in the contaminated water.

Aspect 10 provides the method of any one of Aspects 1-9, wherein the product water has a concentration of the fluoroalkyl compound and/or the galvanic cell-treated fluoroalkyl compound that is 0.0001% to 5% of the concentration of the fluoroalkyl compound in the contaminated water.

Aspect 11 provides the method of any one of Aspects 1-10, wherein the contacting of the galvanic cell and the contaminated water is performed in a plug-flow reactor.

Aspect 12 provides the method of any one of Aspects 1-11, wherein the contacting of the galvanic cell and the contaminated water is performed in a tank.

Aspect 13 provides the method of any one of Aspects 1-12, wherein the galvanic cell comprises:
- an anode comprising Mg, Al, Fe, Zn, Cu, Cd, Cr, Hg, Ni, V, Ce, or a combination thereof; and
- a cathode having a different composition than the anode, wherein the cathode comprises Al, Zn, Fe, Cd, Ni, Sn, Pb, Cu, Ag, Co, Mn, Pd, Ag, carbon, or a combination thereof.

Aspect 14 provides the method of Aspect 13, wherein the anode comprises Al and the cathode comprises Cu.

Aspect 15 provides the method of any one of Aspects 13-14, wherein the anode is 90 wt % to 100 wt % Al, and the cathode is 90 wt % to 100 wt % Cu.

Aspect 16 provides the method of any one of Aspects 13-15, wherein the galvanic cell comprises not more than one of the anodes and not more than one of the cathodes.

Aspect 17 provides the method of any one of Aspects 13-16, wherein the galvanic cell comprises a plurality of the anodes and a plurality of the cathodes.

Aspect 18 provides the method of any one of Aspects 13-17, wherein the cathode is plated and/or deposited onto a surface of the anode.

Aspect 19 provides the method of any one of Aspects 13-18, wherein the cathode and/or the anode comprise a plating and/or deposition thereon comprising Mg, Al, Fe, Zn, Cu, Cd, Cr, Hg, Ni, V, Ce, Sn, Pb, Ag, Co, Mn, Pd, Mo, or a combination thereof.

Aspect 20 provides the method of any one of Aspects 13-19, wherein the anode comprises Cu plated and/or deposited onto a surface thereof, wherein the cathode comprises Cu and wherein the cathode is not plated or deposited on the anode comprising Al.

Aspect 21 provides the method of any one of Aspects 13-20, wherein the anode and the cathode are in physical contact with one another.

Aspect 22 provides the method of any one of Aspects 13-21, wherein the anode and the cathode are free of physical contact with one another.

Aspect 23 provides the method of any one of Aspects 13-22, wherein the anode and cathode independently comprise a rod, a bar, a tube, a sheet, a plate, an inclined plate, a strip, a non-porous material, a porous material, a screen, a wire mesh, or a combination thereof.

Aspect 24 provides the method of any one of Aspects 13-23, wherein the anode and cathode are rods, bars, or a combination thereof.

Aspect 25 provides the method of any one of Aspects 13-24, wherein the anode is a strip, and wherein the cathode is a porous material.

Aspect 26 provides the method of Aspect 25, wherein the porous material comprises a screen, a wire mesh, or a combination thereof.

Aspect 27 provides the method of any one of Aspects 13-26, wherein the anode and the cathode comprise a gap therebetween, wherein the gap is 1 mm to 110 mm.

Aspect 28 provides the method of Aspect 27, wherein the gap is 2 mm to 30 mm.

Aspect 29 provides the method of any one of Aspects 27-28, wherein the galvanic cell comprises a conductive connector that electrically and physically connects the anode and the cathode, wherein the conductive connector maintains the gap between the anode and the cathode.

Aspect 30 provides the method of any one of Aspects 13-29, wherein the galvanic cell comprises a nonconductive connector that physically connects the anode and the cathode.

Aspect 31 provides the method of Aspect 30, wherein the nonconductive connector comprises plastic, glass, rubber, or a combination thereof, and/or wherein the nonconductive connector comprises a conductive connector coated with a non-conductive material.

Aspect 32 provides the method of any one of Aspects 30-31, wherein the nonconductive connector comprises a weld, a fastener, a fastener assembly, a threaded fastener, a screw, a bolt, a bracket, a nut, a washer, or a combination thereof.

Aspect 33 provides the method of any one of Aspects 13-32, wherein the galvanic cell comprises a conductive connector that electrically and physically connects the anode and the cathode.

Aspect 34 provides the method of Aspect 33, wherein the conductive connector comprises Cu, Zn, Fe, Cd, Ni, Sn, Pb, or a combination thereof.

Aspect 35 provides the method of any one of Aspects 33-34, wherein the conductive connector comprises brass, stainless steel, or a combination thereof.

Aspect 36 provides the method of any one of Aspects 33-35, wherein the conductive connector comprises a weld, a fastener, a fastener assembly, a threaded fastener, a screw, a bolt, a bracket, a nut, a washer, or a combination thereof.

Aspect 37 provides the method of any one of Aspects 1-36, further comprising treating the contaminated composition with UV light before or during the contacting of the contaminated composition with the galvanic cell.

Aspect 38 provides the method of Aspect 37, wherein the UV light comprises a wavelength of less than 254 nm.

Aspect 39 provides the method of any one of Aspects 37-38, wherein the UV light comprises a wavelength of 180 nm to 220 nm.

Aspect 40 provides the method of any one of Aspects 1-39, wherein the aqueous concentrate comprises an extract, a foam, a filtration residue, a separated sediment, a slurry, a sludge, a wet precipitate, or a combination thereof.

Aspect 41 provides the method of any one of Aspects 1-40, wherein the aqueous concentrate comprises a metal component comprising a metal formed from an electrode of the galvanic cell, wherein the method further comprises recycling the metal of the metal component comprising combining the metal component and the contaminated water prior to contacting the contaminated water and the galvanic cell.

Aspect 42 provides the method of any one of Aspects 1-41, further comprising destroying the galvanic cell-treated fluoroalkyl compound in the aqueous concentrate.

Aspect 43 provides the method of Aspect 42, wherein destroying the galvanic cell-treated fluoroalkyl compound in the aqueous concentrate comprises destroying 60 wt % to 100 wt % of the galvanic cell-treated fluoroalkyl compound in the aqueous concentrate.

Aspect 44 provides the method of any one of Aspects 42-43, wherein destroying the galvanic cell-treated fluoroalkyl compound in the aqueous concentrate comprises destroying 95 wt % to 100 wt % of the galvanic cell-treated fluoroalkyl compound in the aqueous concentrate.

Aspect 45 provides the method of any one of Aspects 1-44, wherein the destroying the galvanic cell-treated fluoroalkyl compound produces a solid comprising the destroyed fluoroalkyl compound and a liquid comprising dissolved metal component comprising a metal from an electrode of the galvanic cell, wherein the method further comprises separating the liquid and the solid and recycling the metal of the metal component comprising combining the metal component and the contaminated water prior to contacting the contaminated water and the galvanic cell.

Aspect 46 provides the method of any one of Aspects 42-45, wherein the destroying the galvanic cell-treated fluoroalkyl compound comprises thermal treatment, treatment with an electrolytic cell, plasma reactor, supercritical water, combustion, chemical treatment, or a combination thereof.

Aspect 47 provides the method of any one of Aspects 42-46, wherein the destroying the galvanic cell-treated fluoroalkyl compound comprises thermal treatment.

Aspect 48 provides the method of Aspect 47, wherein the thermal treatment comprises heating to a treatment temperature of 1000° C. to 5000° C.

Aspect 49 provides the method of any one of Aspects 47-48, wherein the thermal treatment comprises heating to a treatment temperature of 1400° C. to 2000° C.

Aspect 50 provides the method of any one of Aspects 47-49, wherein the thermal treatment comprises heating to a treatment temperature of 1500° C. or higher.

Aspect 51 provides the method of any one of Aspects 48-50, wherein the thermal treatment comprises maintaining the galvanic cell-treated fluoroalkyl compound at the treatment temperature for a duration of 0.1 see to 24 h.

Aspect 52 provides the method of any one of Aspects 42-51, wherein the destroying the galvanic cell-treated fluoroalkyl compound comprises treatment with an electrolytic cell comprising an electrolytic anode and an electrolytic cathode.

Aspect 53 provides the method of Aspect 52, wherein destroying the galvanic cell-treated fluoroalkyl compound further comprises acidifying the aqueous concentrate prior to the treatment with the electrolytic cell to bring a pH of the aqueous concentrate to a pH of 0.5 to 5.

Aspect 54 provides the method of Aspect 53, wherein acidifying the aqueous concentrate is sufficient to dissolve a metal component in the aqueous concentrate including a metal formed from an electrode of the galvanic cell.

Aspect 55 provides the method of Aspect 54, wherein the metal component comprises an aluminum ion and/or aluminum hydroxide.

Aspect 56 provides the method of any one of Aspects 42-55, comprising acidifying the aqueous concentrate prior to the destruction of the galvanic cell-treated fluoroalkyl compound in the aqueous concentrate, wherein the method further comprises performing a secondary separation to separate a residual solution from the aqueous concentrate after the acidifying and prior to the destruction of the galvanic cell-treated fluoroalkyl compound to concentrate the galvanic cell-treated fluoroalkyl compound in the aqueous concentrate and to form the residual solution separated therefrom.

Aspect 57 provides the method of Aspect 56, wherein the secondary separation comprises filtration, precipitation, extraction, aeration, decantation, or a combination thereof.

Aspect 58 provides the method of any one of Aspects 56-57, wherein the secondary separation comprises aerating the aqueous concentrate to form a foam therein.

Aspect 59 provides the method of claim 58, wherein the secondary separation comprises separating the residual solution from the foam.

Aspect 60 provides the method of claim any one of Aspects 56-59, wherein a ratio of a volume of the aqueous concentrate having the residual solution removed therefrom to a volume of the acidified aqueous concentrate prior to removal of the residual solution therefrom is 1:100,000 to 1:1.

Aspect 61 provides the method of any one of Aspects 56-60, wherein a ratio of a volume of the aqueous concentrate having the residual solution removed therefrom to a volume of the acidified aqueous concentrate prior to removal of the residual solution therefrom is 1:10,000 to 1:5.

Aspect 62 provides the method of any one of Aspects claim 56-61, wherein a ratio of a volume of the aqueous concentrate having the residual solution removed therefrom to a volume of the contaminated water is 1:1,000,000 to 1:1.

Aspect 63 provides the method of any one of Aspects 56-62, wherein a ratio of a volume of the aqueous concentrate having the residual solution removed therefrom to a volume of the contaminated water is 1:100,000 to 1:10.

Aspect 64 provides the method of any one of Aspects 56-63, wherein the residual solution comprises the metal component, further comprising recycling the metal of the metal component comprising combining the contaminated water and the residual solution prior to contacting the contaminated water and the galvanic cell.

Aspect 65 provides the method of claim 64, wherein recycling the metal of the metal component further comprises purging one or more acidification contaminants from the residual solution prior to combining the contaminated water and the residual solution.

Aspect 66 provides the method of any one of Aspects 52-65, wherein the treatment with the electrolytic cell forms an electrolytically-treated composition comprising a solid and a liquid.

Aspect 67 provides the method of Aspect 66, wherein the liquid comprises a metal component comprising a metal formed from an electrode of the galvanic cell, wherein the method further comprises separating the liquid and the solid and recycling the metal of the metal component comprising combining the contaminated water and the liquid comprising the metal component prior to contacting the contaminated water and the galvanic cell.

Aspect 68 provides the method of any one of Aspects 42-67, wherein destroying the galvanic cell-treated fluoroalkyl compound in the aqueous concentrate forms a liquid comprising the metal component, wherein the method further comprises recycling the metal of the metal component comprising combining the contaminated water and the liquid comprising the metal component prior to contacting the water and the galvanic cell, and wherein recycling the metal component further comprises purging one or more acidification contaminants from the liquid comprising the metal component prior to combining the contaminated water and the liquid comprising the metal component.

Aspect 69 provides the method of Aspect 68, wherein the purging comprises removing one or more contaminant ions from the liquid comprising the metal component, wherein the one or more contaminant ions are from the acidification.

Aspect 70 provides the method of any one of Aspects 68-69, wherein the purging comprises removing sulfate, chloride, or a combination thereof, from the liquid comprising the metal component.

Aspect 71 provides the method of any one of Aspects 68-70, wherein the purging comprises raising a pH of the liquid comprising the metal component to 3 or less and filtering out a salt of the one or more contaminant ions from the liquid comprising the metal component.

Aspect 72 provides the method of any one of Aspects 68-71, wherein the purging comprises raising a pH of the liquid comprising the metal component to 3 or less and filtering solid aluminum sulfate from the liquid comprising the metal component.

Aspect 73 provides the method of any one of Aspects 68-72, wherein the purging comprises raising a pH of the liquid comprising the metal component to 4 or less, or 3.5 or less, filtering a solid salt of the metal of the metal component from a residual liquid, and combining the solid salt of the metal of the metal component with the contaminated water.

Aspect 74 provides the method of any one of Aspects 68-73, wherein the purging comprises raising a pH of the liquid comprising the metal component to 4 or less, or 3.5 or less, and filtering aluminum chloride from the liquid comprising the metal component, and combining the solid salt of the metal of the metal component with the contaminated water.

Aspect 75 provides the method of Aspect 67-74, wherein the method further comprises adding a base to the liquid separated from the solid to bring a pH of the liquid to 3-6.

Aspect 76 provides the method of any one of Aspects 66-75, wherein the method further comprises adding a base to the electrolytically-treated composition to bring a pH of the electrolytically-treated composition to 5.5-8.

Aspect 77 provides the method of Aspect 76, wherein the method further comprises filtering the electrolytically-treated composition having base added thereto and adding a resulting liquid to the contaminated water.

Aspect 78 provides the method of any one of Aspects 52-77, wherein the method comprises treating the galvanic cell-treated fluoroalkyl compound with the electrolytic cell for a duration of 1 sec to 24 h.

Aspect 79 provides the method of Aspect 78, wherein the duration is 50 min to 200 min.

Aspect 80 provides the method of any one of Aspects 52-79, wherein the electrolytic anode comprises an anode material comprising a metal oxide, a transition metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof. For example, the electrolytic anode can include $RuO_2$ and $IrO_2$, or can include $PbO_2$ and $Bi_2O_3$, or can include $IrO_2$, $RuO_2$, $PtO_2$, and $Rh_2O_3$. The electrolytic anode can be formed entirely of the anode material (e.g., and is free of catalyst coatings) or the electrolytic anode can include a coating or deposition of the anode material (e.g., as a catalyst coating) on a suitable substrate such as titanium, stainless steel, carbon steel, carbon (e.g., BDD, graphite, graphene, or a combination thereof), or a combination thereof. The catalyst coating can be on one major face of the electrolytic anode or on both major faces.

Aspect 81 provides the method of any one of Aspects 52-80, wherein the electrolytic cathode comprises stainless steel, titanium, carbon (e.g., BDD, graphite, graphene, or a combination thereof), carbon steel, a precious metal, platinum, nickel, iron, copper, silver, or a combination thereof. The electrolytic cathode can be formed entirely of the cathode material (e.g., and is free of catalyst coatings) or the electrolytic cathode can include a coating of the cathode material (e.g., as a catalyst coating) on a suitable substrate, such as on a substrate that is titanium, stainless steel, carbon steel, Pt, Ni, Fe, Cu, Ag, carbon, or a combination thereof. The catalyst coating can be on one major face of the electrolytic cathode or on both major faces.

Aspect 82 provides the method of any one of Aspects 52-81, wherein the treatment with the electrolytic cell comprises applying a voltage across the electrolytic anode and the electrolytic cathode sufficient to generate a current density of 5-500 $mA/cm^2$.

Aspect 83 provides the method of Aspect 82, wherein the voltage is sufficient to generate a current density of 10-40 $mA/cm^2$.

Aspect 84 provides the method of any one of Aspects 52-83, wherein the treatment with the electrolytic cell comprises contacting an aqueous composition comprising the galvanic cell-treated fluoroalkyl compound with the electrolytic cell, wherein the aqueous composition comprises the aqueous concentrate.

Aspect 85 provides the method of Aspect 84, wherein the treatment with the electrolytic cell further comprises adjusting a pH of the aqueous composition before or during contacting of the aqueous composition with the electrolytic cell.

Aspect 86 provides the method of any one of Aspects 52-85, wherein the electrolytic cell comprises one or more bipolar electrodes positioned between the electrolytic anode and the electrolytic cathode.

Aspect 87 provides the method of Aspect 86, wherein the electrolytic anode, the electrolytic cathode, and the bipolar electrodes are each in the form of a plate that are arranged parallel to one another.

Aspect 88 provides the method of any one of Aspects 86-87, where the electrolytic anode plate, electrolytic cathode plate, and bipolar plates each independently have a thickness of about 0.1 mm to 50 mm.

Aspect 89 provides the method of any one of Aspects 87-88, wherein the electrolytic anode plate, electrolytic cathode plate, and bipolar plates each independently have a thickness of about 1 mm to 30 mm.

Aspect 90 provides the method of any one of Aspects 87-89, wherein the electrolytic anode plate, electrolytic cathode plate, and bipolar plates have about the same thickness.

Aspect 91 provides the method of any one of Aspects 86-90, wherein the electrolytic anode, the electrolytic cathode, and the bipolar electrodes are free of physical contact with one another, and wherein the electrolytic anode, electrolytic cathode, and the bipolar electrodes are free of electrical connection with one another other than an aqueous liquid in which the electrolytic cell is immersed (e.g., the aqueous concentrate) and an optional electrical potential applied across the electrolytic anode and the electrolytic cathode.

Aspect 92 provides the method of any one of Aspects 86-91, wherein the electrolytic cell comprises a gap between the electrolytic anode and the bipolar electrodes and a gap between the bipolar electrodes and the electrolytic cathode that are each independently 0.1 mm to 20 mm.

Aspect 93 provides the method of Aspect 92, wherein the gap between the electrolytic anode and the bipolar electrodes and the gap between the bipolar electrodes and the electrolytic cathode are each independently 0.1 mm to 5 mm.

Aspect 94 provides the method of any one of Aspects 86-93, wherein the electrolytic cell comprises a gap between the bipolar electrodes that is 0.1 mm to 20 mm.

Aspect 95 provides the method of Aspect 84, wherein the gap between the bipolar electrodes is 0.1 mm to 5 mm.

Aspect 96 provides the method of any one of Aspects 86-95, wherein the electrolytic cell comprises an electrically non-conductive connector that physically connects the electrolytic anode, bipolar plates, and electrolytic cathode to one another and that maintains gaps between the electrolytic anode and bipolar plates, between the bipolar plates, and between the bipolar plates and the electrolytic cathode.

Aspect 97 provides the method of any one of Aspects 86-96, wherein the electrolytic cell comprises one and not more than one of the bipolar electrodes positioned between the electrolytic anode and electrolytic cathode.

Aspect 98 provides the method of any one of Aspects 86-97, wherein the electrolytic cell comprises two or more of the bipolar electrodes positioned between the electrolytic anode and electrolytic cathode.

Aspect 99 provides the method of any one of Aspects 86-98, wherein the electrolytic anode comprises titanium, stainless steel, carbon steel, carbon (e.g., BDD, graphite, graphene, or a combination thereof), or a combination thereof.

Aspect 100 provides the method of any one of Aspects 86-99, wherein the electrolytic anode comprises Ti.

Aspect 101 provides the method of any one of Aspects 86-100, wherein the electrolytic anode comprises a catalyst coating.

Aspect 102 provides the method of Aspect 101, wherein the electrolytic anode comprises the catalyst coating on both major faces of the electrolytic anode.

Aspect 103 provides the method of any one of Aspects 101-102, wherein the catalyst coating comprises one or more transition metal oxides.

Aspect 104 provides the method of any one of Aspects 101-103, wherein the catalyst coating comprises a metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof. For example, the catalyst coating can include $RuO_2$ and $IrO_2$, or can include $PbO_2$ and $Bi_2O_3$, or can include $IrO_2$, $RuO_2$, $PtO_2$, and $Rh_2O_3$.

Aspect 105 provides the method of any one of Aspects 101-104, wherein the catalyst coating comprises $RuO_2$ and $IrO_2$.

Aspect 106 provides the method of any one of Aspects 101-105, wherein the catalyst coating comprises $PbO_2$ and $Bi_2O_3$.

Aspect 107 provides the method of any one of Aspects 86-106, wherein the electrolytic cathode comprises a cathode material comprising titanium, stainless steel, carbon steel, Pt, Ni, Fe, Cu, Ag, carbon, or a combination thereof. The electrolytic cathode can be formed entirely of the cathode material or the electrolytic cathode can include a coating of the cathode material on a suitable substrate, such as on a substrate that is titanium, stainless steel, carbon steel, Pt, Ni, Fe, Cu, Ag, carbon, or a combination thereof.

Aspect 108 provides the method of any one of Aspects 86-107, wherein the electrolytic cathode comprises Ti.

Aspect 109 provides the method of any one of Aspects 86-108, wherein the electrolytic cathode is free of coatings.

Aspect 110 provides the method of any one of Aspects 86-109, wherein the electrolytic cathode is free of catalyst coatings, or wherein the electrolytic cathode includes a catalyst coating, such as a catalyst coating comprising Ti, Pt, Ni, stainless steel, carbon steel, Fe, Cu, Ag, carbon (e.g., BDD, graphite, graphene, or a combination thereof), or a combination thereof.

Aspect 111 provides the method of any one of Aspects 86-110, wherein the bipolar electrodes comprise titanium, stainless steel, carbon, or a combination thereof.

Aspect 112 provides the method of any one of Aspects 86-111, wherein the bipolar electrodes comprise Ti.

Aspect 113 provides the method of any one of Aspects 86-112, wherein the bipolar electrodes are free of coatings.

Aspect 114 provides the method of any one of Aspects 86-113, wherein the bipolar electrodes are free of catalyst coatings.

Aspect 115 provides the method of any one of Aspects 86-114, wherein
the bipolar electrodes comprise a catalyst coating.

Aspect 116 provides the method of Aspect 115, wherein the bipolar electrodes comprise the catalyst coating on both major faces of each of the bipolar plates.

Aspect 117 provides the method of Aspect 115, wherein the bipolar electrodes comprise the catalyst coating on one major face of each of the bipolar plates (e.g., the face that faces the nearest electrolytic cathode), wherein the other major face of each of the bipolar plates is free of a catalyst coating (e.g., the face that faces the nearest electrolytic anode) or comprises a catalyst coating having a different composition than the catalyst coating on the opposite face.

Aspect 118 provides the method of any one of Aspects 115-117, wherein the catalyst coating comprises one or more transition metal oxides.

Aspect 119 provides the method of any one of Aspects 115-118, wherein the catalyst coating comprises a metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum (e.g., platinum coating on titanium), $PtO_2$, $MnO_2$, $CeO_2$, $Rh_2O_3$, carbon (e.g., BDD, graphite, graphene, or a combination thereof), or a combination thereof.

Aspect 120 provides the method of any one of Aspects 115-119, wherein the destroying the galvanic cell-treated fluoroalkyl compound comprises treatment with a plurality of the electrolytic cells.

Aspect 121 provides the method of Aspect 120, wherein the plurality of the electrolytic cells comprises 2 to 1,000 of the electrolytic cells.

Aspect 122 provides the method of any one of Aspects 86-121, wherein the electrolytic anode, electrolytic cathode, and bipolar electrodes are a first electrolytic anode, a first electrolytic cathode, and first bipolar electrodes, wherein the destroying the galvanic cell-treated fluoroalkyl compound further comprises treatment with a second electrolytic cell comprising the first electrolytic cathode, one or more second bipolar electrodes, and a second electrolytic anode, wherein the second bipolar electrodes are between the first electrolytic cathode and the second electrolytic anode.

Aspect 123 provides the method of Aspect 122, wherein the destroying the galvanic cell-treated fluoroalkyl compound further comprises treatment with a third electrolytic cell comprising the second electrolytic anode, one or more third bipolar electrodes, and a second electrolytic cathode.

Aspect 124 provides the method of any one of Aspects 86-123, wherein the electrolytic anode, electrolytic cathode, and bipolar electrodes are a first electrolytic anode, a first electrolytic cathode, and first bipolar electrodes, wherein the destroying the galvanic cell-treated fluoroalkyl compound further comprises treatment with a second electrolytic cell comprising the first electrolytic anode, one or more second bipolar electrodes, and a second electrolytic cathode, wherein the second bipolar electrodes are between the first electrolytic anode and the second electrolytic cathode.

Aspect 125 provides the method of Aspect 124, wherein the destroying the galvanic cell-treated fluoroalkyl compound further comprises treatment with a third electrolytic cell comprising the second electrolytic cathode, one or more third bipolar electrodes, and a second electrolytic anode.

Aspect 126 provides the method of any one of Aspects 85-125, wherein the adjusting of the pH of the aqueous composition comprises adjusting the pH to 1 to 4.

Aspect 127 provides the method of any one of Aspects 85-126, wherein the adjusting of the pH of the aqueous composition comprises adjusting the pH to 2.0 to 2.5.

Aspect 128 provides the method of any one of Aspects 52-127, wherein the aqueous composition further comprises added water.

Aspect 129 provides the method of any one of Aspects 52-128, wherein the aqueous composition further comprises an added additive comprising an acid, a buffer, a sulfate salt, a persulfate salt, an oxidizer, NaCl, KCl, or a combination thereof.

Aspect 130 provides the method of any one of Aspects 52-129, wherein the aqueous composition further comprises an added additive comprising $H_2SO_4$, HCl, $K_2SO_4$, $Na_2SO_4$, $Na_2S_2O_8$, $KHSO_5$, $H_2O_2$, NaCl, KCl, or a combination thereof.

Aspect 131 provides the method of Aspect 130, wherein the method further comprises combining the additive with the aqueous concentrate and/or the aqueous composition prior to and/or during the contacting of the aqueous composition with the electrolytic cell.

Aspect 132 provides the method of any one of Aspects 42-131, further comprising removing water from the aqueous concentrate to form a dried contaminant composition comprising the galvanic cell-treated fluoroalkyl compound, wherein destroying the galvanic cell-treated fluoroalkyl compound in the aqueous concentrate comprises destroying the galvanic cell-treated fluoroalkyl compound in the dried contaminant composition.

Aspect 133 provides the method of any one of Aspects 1-132, wherein the galvanic cell-treated water comprising the galvanic cell-treated fluoroalkyl compound comprises a foam that comprises the galvanic cell-treated fluoroalkyl compound.

Aspect 134 provides the method of Aspect 133, wherein the foam comprises bubbles formed on the anode and/or cathode, bubbles added to the solution with a bubbler, or a combination thereof.

Aspect 135 provides the method of Aspect 134, wherein the bubbles formed on the anode and/or cathode comprise hydrogen, oxygen, or a combination thereof.

Aspect 136 provides the method of any one of Aspects 134-135, wherein the bubbles added to the solution with a bubbler comprise air, an inert gas, nitrogen, hydrogen, a noble gas, helium argon, xenon, or a combination thereof.

Aspect 137 provides the method of any one of Aspects 133-136, wherein the method is substantially free of vigorous stirring and/or mixing of the contaminated water contacting the galvanic cell.

Aspect 138 provides the method of any one of Aspects 133-137, wherein the foam has a higher concentration of the galvanic cell-treated fluoroalkyl compound than a remainder of the galvanic cell-treated water.

Aspect 139 provides the method of any one of Aspects 133-128, wherein separating the galvanic cell-treated fluoroalkyl compound from the galvanic cell-treated water comprises removing the foam from the galvanic cell-treated water, wherein the aqueous concentrate comprises the foam.

Aspect 140 provides the method of Aspect 139, wherein the removing of the foam comprises scraping the foam from the top of the galvanic cell-treated water, scooping the foam from the top of the galvanic cell-treated water, sucking the foam from the top of the galvanic cell-treated water, filtering the foam from the galvanic cell-treated water, decanting the foam from the galvanic cell-treated water, or a combination thereof.

Aspect 141 provides the method of any one of Aspects 139-140, wherein the removing of the foam comprises scraping and/or scooping the foam from the top of the galvanic cell-treated water.

Aspect 142 provides the method of any one of Aspects 139-141, further comprising breaking the foam, filtering the foam, or a combination thereof, to form a broken foam.

Aspect 143 provides the method of Aspect 142, wherein breaking the foam comprises applying vacuum, applying heat, allowing the foam to sit for a duration, or a combination thereof.

Aspect 144 provides the method of any one of Aspects 142-143, further comprising filtering the broken foam to form a residue comprising the galvanic cell-treated fluoroalkyl compound, wherein the residue has a higher concentration of the galvanic cell-treated fluoroalkyl compound than a filtrate formed during the filtering.

Aspect 145 provides the method of any one of Aspects 1-144, wherein separating the galvanic cell-treated fluoroalkyl compound from the galvanic cell-treated water comprises:
  adding a cationic polymer to the galvanic cell-treated water to form a complex comprising the galvanic cell-treated fluoroalkyl compound and the cationic polymer, and
  separating the complex from the galvanic cell-treated water to form the aqueous concentrate and the product water, wherein the aqueous concentrate comprises a higher concentration of the complex than the product water.

Aspect 146 provides the method of Aspect 145, wherein the complex is a solid in the galvanic cell-treated water.

Aspect 147 provides the method of any one of Aspects 145-146, wherein the complex is a flocculant in the galvanic cell-treated water.

Aspect 148 provides the method of any one of Aspects 145-147, wherein the cationic polymer is a flocculating agent.

Aspect 149 provides the method of any one of Aspects 145-148, wherein the cationic polymer is a natural polymer, a synthetic polymer, a cationic polysaccharide, a gum, alginic acid, cellulose, a cellulose derivative, dextran, glycogen, a polyelectrolyte, a polymer comprising a quaternary ammonium group, poly(diallyl dimethyl ammonium chloride) (polyDADMAC), or a combination thereof.

Aspect 150 provides the method of any one of Aspects 145-149, wherein the separating of the complex from the galvanic cell-treated water comprises settling the complex from the galvanic cell-treated water, filtering the complex from the galvanic cell-treated water, or a combination thereof.

Aspect 151 provides the method of any one of Aspects 145-150, wherein the separating of the complex from the galvanic cell-treated water comprises placing the galvanic cell-treated water comprising the complex in a settling tank to allow the complex to settle to a bottom thereof for collection, and filtering the galvanic cell-treated water to form a residue comprising the complex, wherein the residue has a higher concentration of the galvanic cell-treated fluoroalkyl compound than a filtrate formed by the filtering.

Aspect 152 provides the method of any one of Aspects 1-151, further comprising pretreating the contaminated water prior to and/or during contacting the contaminated water with the galvanic cell.

Aspect 153 provides the method of Aspect 152, wherein the pretreatment comprises adjusting pH of the contaminated water, adding one or more additives to the contaminated water, filtering the contaminated water, allowing sediment to settle from the contaminated water, removing nitrogen from the contaminated water (e.g., via electrochemical treatment of the water, or treatment with an oxidizer such as sedum hypochlorite, to remove nitrogen as ammonia), removing phosphorus from the contaminated water, treating the contaminated water with a pretreatment galvanic cell, or a combination thereof.

Aspect 154 provides the method of any one of Aspects 152-153, wherein the pretreatment comprises adjusting pH of the contaminated water to 2 to 12.

Aspect 155 provides the method of any one of Aspects 152-154, wherein the pretreatment comprises adjusting pH of the contaminated water to 5 to 7.

Aspect 156 provides the method of any one of Aspects 152-155, wherein the pretreatment comprises adjusting pH of the contaminated water to 10 to 12.

Aspect 157 provides the method of any one of Aspects 152-153, wherein the pretreatment comprises adding base to the contaminated water to bring a pH of the contaminated water to 9.5 to 11.5.

Aspect 158 provides the method of Aspect 157, wherein the pretreatment further comprises filtering the contaminated water having base added thereto, wherein the filtered contaminated water is subjected to contacting with the galvanic cell.

Aspect 159 provides the method of Aspect 158, wherein the method further comprises adding solids removed during the filtration of the contaminated water having base added thereto to the aqueous concentrate.

Aspect 160 provides the method of any one of Aspects 157-159, wherein the pretreatment further comprises removing nitrogen from the contaminated water as ammonia after adding the base to the contaminated water.

Aspect 161 provides the method of Aspect 160, wherein the removing of nitrogen comprises combining the contaminated water with an oxidizer.

Aspect 162 provides the method of Aspect 161, wherein the oxidizer comprises sodium hydrochlorite.

Aspect 163 provides the method of any one of Aspects 160-162, further comprising filtering the contaminated water having nitrogen removed therefrom as ammonia, wherein the filtered contaminated water is subjected to contacting with the galvanic cell.

Aspect 164 provides the method of Aspect 163, wherein the method further comprises adding solids removing during filtration of the contaminated water having nitrogen removed as ammonia to the aqueous concentrate.

Aspect 165 provides the method of any one of Aspects 1-164, wherein the method further comprises adding a metal component comprising a metal to the contaminated water, wherein the metal of the metal component is the same as a metal in one or more electrodes of the galvanic cell.

Aspect 166 provides the method of Aspect 165, wherein the metal component comprises a recycled metal formed from one or more electrodes of the galvanic cell during the contacting of the galvanic cell and the contaminated water.

Aspect 167 provides the method of any one of Aspects 165-166, wherein the metal component comprises a metal that is not formed from the one or more electrodes of the galvanic cell during the contacting of the galvanic cell and the contaminated water.

Aspect 168 provides the method of any one of Aspects 165-167, wherein the metal component is added to the contaminated water prior to any pretreatment, after addition of base, after addition of base and removal of nitrogen as ammonia, or a combination thereof.

Aspect 169 provides the method of any one of Aspects 165-167, wherein the metal component is added to the contaminated water after addition of base thereto.

Aspect 170 provides the method of any one of Aspects 165-167, wherein the metal component is added to the contaminated water after addition of base thereto and after removal of nitrogen therefrom as ammonia.

Aspect 171 provides the method of any one of Aspects 152-170, wherein the pretreatment comprises adding one or more additives to the contaminated water, the one or more additives comprising a polymer flocculant, a radical precursor, hydrogen peroxide, a persulfate salt, an oxidizer, sodium hypochlorite, NaCl, $CaCl_2$), KCl, or a combination thereof.

Aspect 172 provides the method of Aspect 171, wherein the one or more additives comprise a radical precursor comprising HOOH, $O_3$, $S_2O_8$, $I^-$, $CO_3^{2-}$, $HCO_3^-$, $H_2PO_4^-$, $HPO_4^{2-}$, $PO_4^{3-}$, $HSO_3^-$, or a combination thereof.

Aspect 173 provides the method of any one of Aspects 171-172, wherein the oxidizer comprises ferrate, ozone, ferric chloride ($FeCl_3$), potassium permanganate, potassium dichromate, potassium chlorate, potassium persulfate, sodium persulfate, perchloric acid, peracetic acid, potassium monopersulfate, hydrogen peroxide, sodium hypochlorite, potassium hypochlorite, hydroxide, sulfite, a free radical via decomposition thereof, or a combination thereof.

Aspect 174 provides the method of any one of Aspects 1-173, wherein the contaminated water comprises one or more non-fluoroalkyl compounds, wherein the contacting of the contaminated water with the galvanic cell forms a precipitate in the galvanic cell-treated water, the precipitate comprising the one or more non-fluoroalkyl compounds and/or reaction products thereof, wherein the method further comprises removing the precipitate from the galvanic cell-treated water such that the product water has a lower concentration of the non-fluoroalkyl compound than the contaminated water.

Aspect 175 provides the method of any one of Aspects 1-174, wherein the contaminated water comprises phosphorus, wherein the contacting of the contaminated water with the galvanic cell forms a precipitate in the galvanic cell-treated water, the precipitate comprising the phosphorus from the contaminated water, wherein the method further comprises removing the precipitate from the galvanic cell-treated water such that the product water has a lower concentration of phosphorus than the contaminated water.

Aspect 176 provides the method of any one of Aspects 1-175, wherein the contacting of the contaminated water with the galvanic cell eliminates or reduces an emulsion in the contaminated water, coagulates and/or precipitates suspended solids from the contaminated water, removes or decreases the concentration of one or more organic compounds in the contaminated water, removes or decreases the concentration of one or more inorganic compounds in the contaminated water, removes or decreases the concentration of one or more dyes and/or inks in the contaminated water, removes or decreases the concentration of one or more metals in the contaminated water, removes or decreases the concentration of one or more heavy metals in the contaminated water, removes or decreases the concentration of one or more toxic compounds and/or materials in the contaminated water, removes or decreases the concentration of fluoride in the contaminated water, removes or decreases the concentration of sulfide in the contaminated water, removes or decreases the concentration of arsenic in the contaminated water, reduces the chemical oxygen demand (COD) of the contaminated water, removes or decreases the concentration of silica in the contaminated water, reduces the turbidity of the contaminated water, or a combination thereof.

Aspect 177 provides a method of treating contaminated water, the method comprising:
  contacting the contaminated water comprising a fluoroalkyl compound with a galvanic cell to form galvanic cell-treated water comprising a foam comprising a galvanic cell-treated fluoroalkyl compound, the galvanic cell comprising
    an anode comprising Al, and
    a cathode having a different composition than the anode, wherein the cathode comprises Cu; and
  removing the foam from the galvanic cell-treated water to form product water having a lower concentration of the fluoroalkyl compound than the contaminated water and to form removed foam having a higher concentration of the galvanic cell-treated water than the product water.

Aspect 178 provides a method of treating contaminated water, the method comprising:
  contacting the contaminated water comprising a fluoroalkyl compound with a galvanic cell to form galvanic cell-treated water comprising a galvanic cell-treated fluoroalkyl compound, the galvanic cell comprising
    an anode comprising Al, and
    a cathode having a different composition than the anode, wherein the cathode comprises Cu;
  adding a cationic polymer to the galvanic cell-treated water to form a complex comprising the galvanic cell-treated fluoroalkyl compound and the cationic polymer; and
  separating the complex from the galvanic cell-treated water to form product water having a lower concentration of the fluoroalkyl compound than the contaminated water and to form an aqueous concentrate having a higher concentration of the complex than the product water.

Aspect 179 provides a method of treating contaminated water, the method comprising:
  contacting the contaminated water comprising a fluoroalkyl compound with a galvanic cell to form galvanic cell-treated water comprising a galvanic cell-treated fluoroalkyl compound, the galvanic cell comprising
    an anode comprising Al, and
    a cathode having a different composition than the anode, wherein the cathode comprises Cu;
  separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
  destroying the galvanic cell-treated fluoroalkyl compound in the aqueous concentrate, the destroying comprising thermal treatment, treatment with an electrolytic cell, plasma reactor, supercritical water, combustion, chemical treatment, or a combination thereof.

Aspect 180 provides a method of treating contaminated water, the method comprising:
  contacting the contaminated water comprising a fluoroalkyl compound with a galvanic cell to form galvanic cell-treated water comprising a galvanic cell-treated fluoroalkyl compound, the galvanic cell comprising
    an anode comprising Al, and
    a cathode having a different composition than the anode, wherein the cathode comprises Cu;
  separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
  destroying the galvanic cell-treated fluoroalkyl compound in the aqueous concentrate, the destroying comprising treatment with an electrolytic cell comprising an electrochemical cathode and an electrochemical anode, wherein the electrolytic anode comprises a metal oxide, a mixed metal oxide (MMO), $Ti_4O_7$, $PbO_2$, boron-doped diamond (BDD), $SnO_2$, $Bi_2O_3$, $RuO_2$, $IrO_2$, $Ta_2O_5$, a precious metal, platinum, $PtO_2$, $MnO_2$, $CeO_2$, $Rh_2O_3$, carbon, or a combination thereof, wherein the electrolytic cathode comprises Ti, Pt, Ni, stainless steel, carbon steel, Fe, Cu, Ag, carbon, or a combination thereof.

Aspect 181 provides a method of treating contaminated water, the method comprising:
  contacting the contaminated water comprising a fluoroalkyl compound with a galvanic cell to form galvanic cell-treated water comprising a galvanic cell-treated fluoroalkyl compound; adding a metal component comprising a metal to the contaminated water prior to or during contacting of the contaminated water and the galvanic cell, wherein the metal of the metal component is the same as a metal in one or more electrodes of the galvanic cell; and
  separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Aspect 182 provides a method of treating contaminated water, the method comprising:
  contacting the contaminated water comprising a fluoroalkyl compound with a galvanic cell to form galvanic cell-treated water comprising a galvanic cell-treated fluoroalkyl compound, the galvanic cell comprising
    an anode comprising Al, and
    a cathode having a different composition than the anode, wherein the cathode comprises Cu;
  adding aluminum ions and/or aluminum hydroxide to the contaminated water prior to or during contacting of the contaminated water and the galvanic cell, wherein the aluminum ions and/or aluminum hydroxide added to the contaminated water are aluminum ions and/or aluminum hydroxide generated formed by the aluminum anode of the galvanic cell during a previous cycle of contacting of the contaminated water with the galvanic cell; and
  separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

Aspect 183 provides a method of treating contaminated water, the method comprising:
contacting the contaminated water comprising a fluoroalkyl compound with a galvanic cell to form galvanic cell-treated water comprising a galvanic cell-treated fluoroalkyl compound, the galvanic cell comprising
an anode comprising Al, and
a cathode having a different composition than the anode, wherein the cathode comprises Cu;
separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
acidifying the aqueous concentrate;
performing a secondary separation to separate a residual solution from the aqueous concentrate after the acidification and to concentrate the galvanic cell-treated fluoroalkyl compound in the aqueous concentrate; and
adding aluminum ions and/or aluminum hydroxide from the residual solution to the contaminated water prior to or during contacting of the contaminated water and the galvanic cell, wherein the aluminum ions and/or aluminum hydroxide added to the contaminated water are aluminum ions and/or aluminum hydroxide generated by the aluminum anode of the galvanic cell during a previous cycle of contacting of the contaminated water with the galvanic cell.

Aspect 184 provides a method of treating contaminated water, the method comprising:
contacting the contaminated water comprising a fluoroalkyl compound with a galvanic cell to form galvanic cell-treated water comprising a galvanic cell-treated fluoroalkyl compound, the galvanic cell comprising
an anode comprising Al, and
a cathode having a different composition than the anode, wherein the cathode comprises Cu;
separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
acidifying the aqueous concentrate;
separating from the acidified aqueous concentrate a liquid comprising aluminum ions and/or aluminum hydroxide;
purging one or more acidification contaminants from the liquid comprising the aluminum ions and/or aluminum hydroxide; and
adding the liquid comprising the aluminum ions and/or aluminum hydroxide to the contaminated water prior to or during contacting of the contaminated water and the galvanic cell, wherein the aluminum ions and/or aluminum hydroxide added to the contaminated water are aluminum ions and/or aluminum hydroxide generated by the aluminum anode of the galvanic cell during a previous cycle of contacting of the contaminated water with the galvanic cell.

Aspect 185 provides a method of treating contaminated water, the method comprising:
contacting the contaminated water comprising a fluoroalkyl compound with a galvanic cell to form galvanic cell-treated water comprising a galvanic cell-treated fluoroalkyl compound, the galvanic cell comprising
an anode comprising Al, and
a cathode having a different composition than the anode, wherein the cathode comprises Cu;
separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
acidifying the aqueous concentrate;
destroying the galvanic cell-treated fluoroalkyl compound in the aqueous concentrate to form a liquid comprising a metal component comprising aluminum from the anode;
purging one or more acidification contaminants from the liquid comprising the metal component; and
recycling the metal component comprising combining the contaminated water and the liquid comprising the metal ion prior to or during the contacting of the contaminated water and the galvanic cell, wherein the aluminum in the metal component in the liquid comprising the metal component added to the contaminated water is aluminum generated by the aluminum anode of the galvanic cell during a previous cycle of contacting of the contaminated water with the galvanic cell.

Aspect 186 provides the method of any one or any combination of Aspects 1-185 optionally configured such that all elements or options recited are available to use or select from.

What is claimed is:

1. A method of treating contaminated water, the method comprising:
contacting the contaminated water comprising a fluoroalkyl compound with a galvanic cell to form galvanic cell-treated water comprising a galvanic cell-treated fluoroalkyl compound, wherein the fluoroalkyl compound is a perfluoroalkyl substance, a polyfluoroalkyl substance, a perfluoroalkyl acid (PFAA), or a combination thereof; and
separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water.

2. The method of claim 1, wherein the contaminated water has a concentration of the fluoroalkyl compound of 1 part per trillion (ppt) to 100 parts per million (ppm), and wherein the product water has a concentration of the fluoroalkyl compound that is 0.0001% to 20% of the concentration of the fluoroalkyl compound in the contaminated water.

3. The method of claim 1, wherein the galvanic cell comprises:
an anode comprising Al; and
a cathode having a different composition than the anode, wherein the cathode comprises Cu.

4. The method of claim 3, wherein the anode and cathode independently comprise a rod, a bar, a tube, a sheet, a plate, an inclined plate, a strip, a non-porous material, a porous material, a screen, a wire mesh, or a combination thereof.

5. The method of claim 3, wherein the anode and the cathode comprise a gap therebetween, wherein the gap is 1 mm to 110 mm.

6. The method of claim 1, further comprising treating the contaminated composition with UV light before or during the contacting of the contaminated composition with the galvanic cell, wherein the UV light comprises a wavelength of less than 254 nm.

7. The method of claim 1, further comprising acidifying the aqueous concentrate and performing a secondary separation to separate a residual solution from the aqueous concentrate after the acidifying to concentrate the galvanic cell-treated fluoroalkyl compound in the aqueous concentrate and to form the residual solution separated therefrom.

8. The method of claim 7, wherein a ratio of a volume of the aqueous concentrate having the residual solution removed therefrom to a volume of the acidified aqueous concentrate prior to removal of the residual solution therefrom is 1:100,000 to 1:1.

9. The method of claim 1, further comprising destroying the galvanic cell-treated fluoroalkyl compound in the aqueous concentrate.

10. The method of claim 9, wherein the destroying the galvanic cell-treated fluoroalkyl compound comprises treatment with an electrolytic cell comprising an electrolytic anode and an electrolytic cathode.

11. The method of claim 10, wherein the electrolytic cell further comprises one or more bipolar electrodes positioned between the electrolytic anode and the electrolytic cathode, wherein the bipolar electrodes comprise titanium, stainless steel, carbon, or a combination thereof.

12. The method of claim 10, wherein the treatment with the electrolytic cell comprises contacting an aqueous composition comprising the galvanic cell-treated fluoroalkyl compound with the electrolytic cell, wherein the aqueous composition comprises the aqueous concentrate and optionally further comprises added water, an acid, a buffer, a sulfate salt, a persulfate salt, an oxidizer, NaCl, KCl, or a combination thereof.

13. The method of claim 1, wherein the galvanic cell-treated water comprising the galvanic cell-treated fluoroalkyl compound comprises a foam that comprises the galvanic cell-treated fluoroalkyl compound, wherein separating the galvanic cell-treated fluoroalkyl compound from the galvanic cell-treated water comprises removing the foam from the galvanic cell-treated water, wherein the aqueous concentrate comprises the foam.

14. The method of claim 1, wherein separating the galvanic cell-treated fluoroalkyl compound from the galvanic cell-treated water comprises:
adding a cationic polymer to the galvanic cell-treated water to form a complex comprising the galvanic cell-treated fluoroalkyl compound and the cationic polymer, and
separating the complex from the galvanic cell-treated water to form the aqueous concentrate and the product water, wherein the aqueous concentrate comprises a higher concentration of the complex than the product water, wherein the separating comprises settling the complex from the galvanic cell-treated water, filtering the complex from the galvanic cell-treated water, or a combination thereof.

15. The method of claim 1, further comprising pretreating the contaminated water prior to and/or during contacting the contaminated water with the galvanic cell, wherein the pretreatment comprises adjusting pH of the contaminated water, adding one or more additives to the contaminated water, filtering the contaminated water, allowing sediment to settle from the contaminated water, removing nitrogen from the contaminated water, removing phosphorus from the contaminated water, treating the contaminated water with a pretreatment galvanic cell, or a combination thereof.

16. The method of claim 15, wherein the pretreatment comprises adding one or more additives to the contaminated water, the one or more additives comprising a polymer flocculant, a radical precursor, hydrogen peroxide, a persulfate salt, an oxidizer, sodium hypochlorite, NaCl, $CaCl_2$, KCl, or a combination thereof.

17. The method of claim 1, further comprising adding a metal component including a metal to the contaminated water prior to or during contacting of the contaminated water and the galvanic cell, wherein the metal component is a ion of the metal, a solid or dissolved compound of the metal, an elemental form of the metal, or a combination thereof, wherein the metal of the metal component is the same as a metal in one or more electrodes of the galvanic cell.

18. The method of claim 17, wherein the metal of the metal component is a recycled metal that is formed in the galvanic cell during a previous cycle of contacting of the contaminated water with the galvanic cell.

19. The method of claim 18, further comprising purging one or more acidification contaminants from a recycle stream comprising the recycled metal prior to contacting the contaminated water and the recycle stream.

20. A method of treating contaminated water, the method comprising:
contacting the contaminated water comprising a fluoroalkyl compound with a galvanic cell to form galvanic cell-treated water comprising a galvanic cell-treated fluoroalkyl compound, the galvanic cell comprising
an anode comprising Al, and
a cathode having a different composition than the anode, wherein the cathode comprises Cu;
separating the galvanic cell-treated fluoroalkyl compound from the galvanic cell-treated water to form product water having a lower concentration of the fluoroalkyl compound than the contaminated water and to form an aqueous concentrate having a higher concentration of the galvanic cell-treated fluoroalkyl compound than the product water;
acidifying the aqueous concentrate;
performing a secondary separation to separate a residual solution from the aqueous concentrate after the acidification and to concentrate the galvanic cell-treated fluoroalkyl compound in the aqueous concentrate;
purging one or more acidification contaminants from the residual solution; and
adding the residual solution to the contaminated water prior to or during contacting of the contaminated water and the galvanic cell, wherein aluminum ions and/or aluminum hydroxide in the residual solution added to the contaminated water are generated by the aluminum anode of the galvanic cell during a previous cycle of contacting of the contaminated water with the galvanic cell.

* * * * *